(12) United States Patent
Almeida et al.

(10) Patent No.: US 9,008,135 B2
(45) Date of Patent: Apr. 14, 2015

(54) TUNABLE PULSE WIDTH LASER

(75) Inventors: Paulo Almeida, Southampton (GB); John Redvers Clowes, Lymington (GB); Pascal Dupriez, Leognan (FR); Anatoly Borisovich Grudinin, Southampton (GB)

(73) Assignee: Fianium Ltd., Southampton (GB)

( * ) Notice: Subject to any disclaimer, the term of this patent is extended or adjusted under 35 U.S.C. 154(b) by 107 days.

(21) Appl. No.: 13/698,050

(22) PCT Filed: May 16, 2011

(86) PCT No.: PCT/US2011/036681
§ 371 (c)(1),
(2), (4) Date: Mar. 28, 2013

(87) PCT Pub. No.: WO2011/146407
PCT Pub. Date: Nov. 24, 2011

(65) Prior Publication Data
US 2013/0177031 A1  Jul. 11, 2013

Related U.S. Application Data

(60) Provisional application No. 61/345,145, filed on May 16, 2010.

(51) Int. Cl.
*H01S 3/10* (2006.01)
*H01S 3/13* (2006.01)
(Continued)

(52) U.S. Cl.
CPC ................ *H01S 3/11* (2013.01); *H01S 3/0057* (2013.01); *H01S 3/06754* (2013.01);
(Continued)

(58) Field of Classification Search
USPC .............................................. 372/20, 25, 30
See application file for complete search history.

(56) References Cited

U.S. PATENT DOCUMENTS 5,541,947 A     7/1996  Mourou et al.
2002/0000426 A1  1/2002  Mead et al.
(Continued)

FOREIGN PATENT DOCUMENTS

WO      WO2009137182 A2    11/2009

OTHER PUBLICATIONS

Communication pursuant to Article 94(3) EPC issued for EP 11721931.1 on Aug. 2014, 21 pages.
(Continued)

*Primary Examiner* — Armando Rodriguez
(74) *Attorney, Agent, or Firm* — Peter Rainville

(57) ABSTRACT

A method of tuning the time duration of laser output pulses, the method including spectrally dispersing optical pulses and further comprising providing an optical pulse having a time duration and a spectral bandwidth; spectrally dispersing (243, 245) the optical pulse so as to provide a selected change in the time duration of the pulse responsive to the spectral bandwidth of the pulse; outputting (226) an optical output pulse having a first time duration that is responsive to the selected change in time duration; providing another optical pulse; changing the amount of spectral bandwidth of the another optical pulse (272) to be different than that of the optical pulse or changing the amount of spectral dispersion so that spectrally dispersing the another optical pulse provides a change in time duration that is different than the selected change; and outputting (226) another optical output pulse having a second time duration that is responsive to the different change in time duration, the second time duration of the another optical output pulse being different than the first time duration of the optical output pulse.

20 Claims, 17 Drawing Sheets

(51) Int. Cl.
*H01S 3/11* (2006.01)
*H01S 3/067* (2006.01)
*H01S 3/00* (2006.01)
*H01S 3/094* (2006.01)
*H01S 3/0941* (2006.01)
*H01S 3/16* (2006.01)
*H01S 3/23* (2006.01)

(52) U.S. Cl.
CPC ........ *H01S 3/094003* (2013.01); *H01S 3/0941* (2013.01); *H01S 3/1618* (2013.01); *H01S 3/2383* (2013.01); *H01S 2301/08* (2013.01); *H01S 3/1112* (2013.01)

(56) References Cited

U.S. PATENT DOCUMENTS

| | | |
|---|---|---|
| 2005/0105865 A1 | 5/2005 | Fermann et al. |
| 2006/0126677 A1 | 6/2006 | Sun et al. |
| 2006/0198402 A1 | 9/2006 | Hodgson et al. |
| 2008/0089698 A1* | 4/2008 | Jiang et al. .......... 398/189 |
| 2010/0040095 A1 | 2/2010 | Mielke et al. |

OTHER PUBLICATIONS

International Search Report issued for PCT/US2011/036681, 8 pages.
International Preliminary Report on Patentability for PCT/US2011/036681, 14 pages.
Response/Amendment made by the Applicant in European Patent Office for EP11721931.1, 8 pages, Jul. 12, 2013.
Communication pursuant to Article 94(3) EPC issued for EP 11721931.1 on Oct. 2013, 5 pages.
Response to communication pursuant to Article 94(3) EPC issued for EP 11721931.1, 10 pages, Feb. 22, 2014.
Written Opinion of the International Searching Authority, issued Feb. 2012, 14 pages.

* cited by examiner

Figure 4
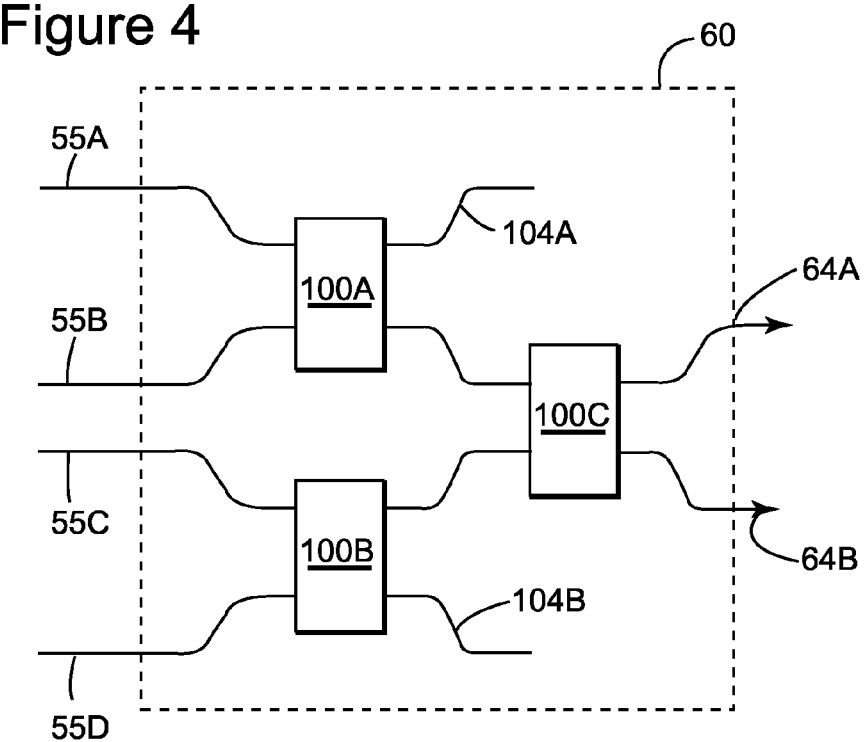
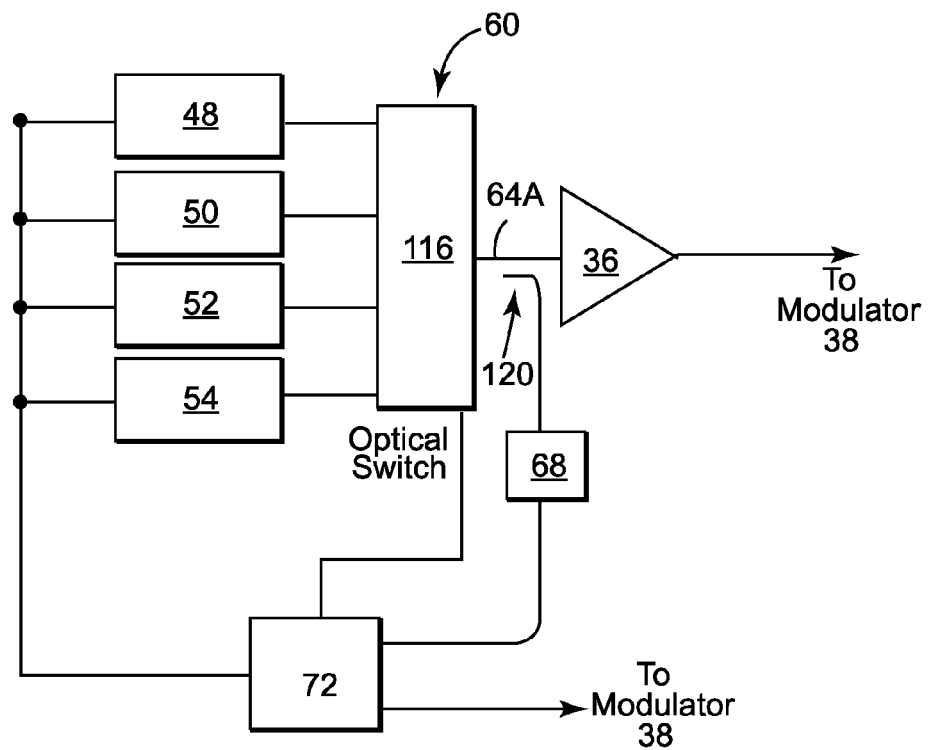
Figure 5

Pulse 2

Pulse 3

Pulse 4

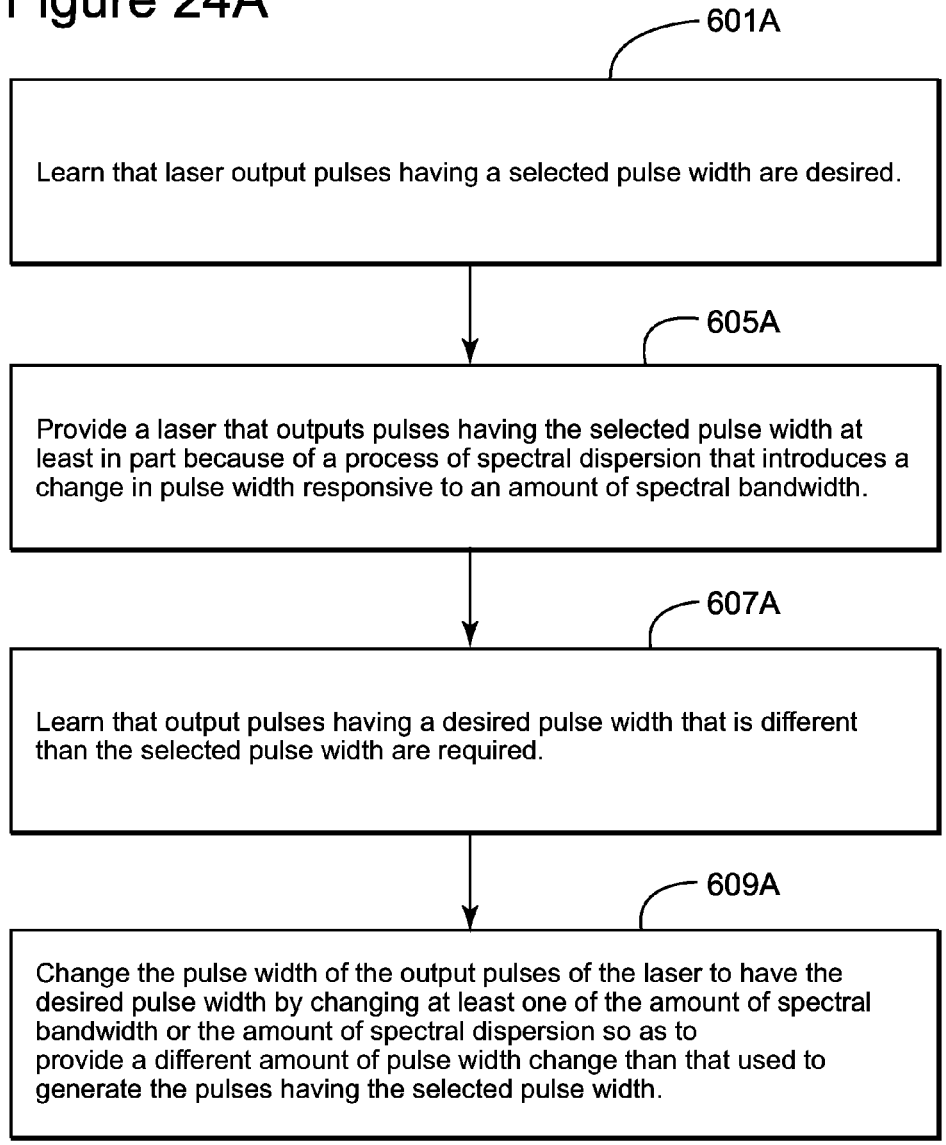

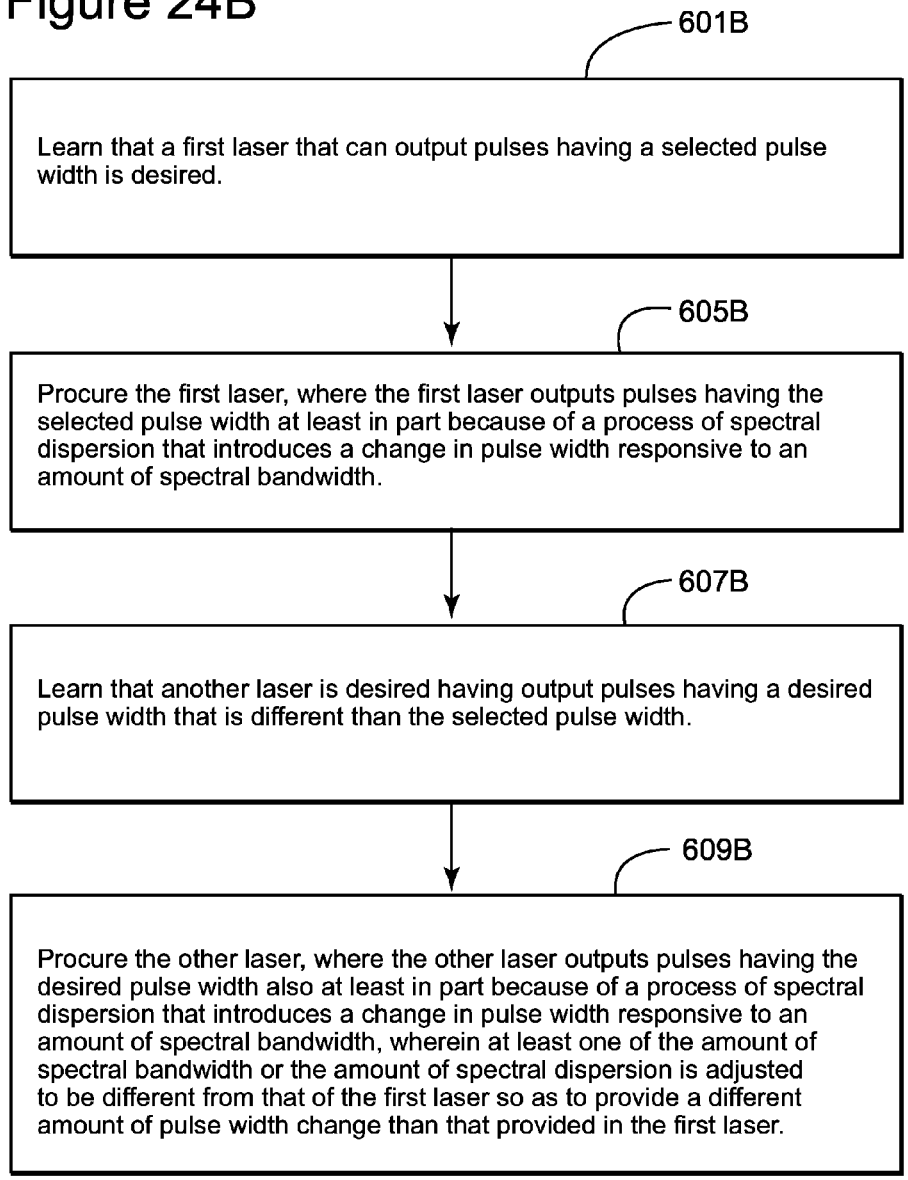

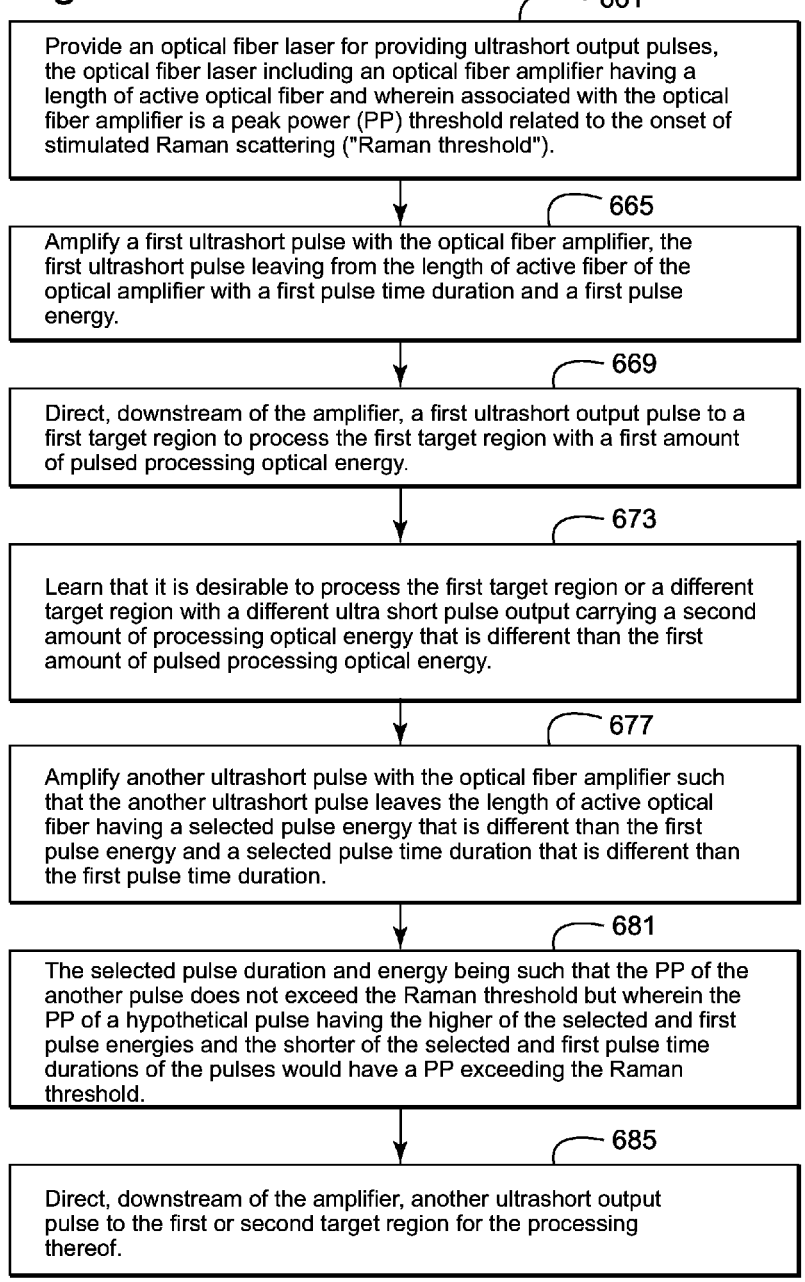

TUNABLE PULSE WIDTH LASER

The present application claims priority to U.S. Provisional Patent Application No. 61/345,145, filed May 16, 2010 to inventors Clowes et al. and entitled "Tunable Pulsewidth Laser", and which is incorporated herein by reference in its entirety.

TECHNICAL FIELD

The present disclosure relates to tunable lasers, such as, for example, fiber lasers having a tunable pulse width, and to the making and using of such lasers.

BACKGROUND OF THE DISCLOSURE

Recent years have seen considerable progress made in the art of laser processing of materials. Lasers can avoid some of the disadvantages of more conventional machining techniques, such as drilling a hole using a drill bit or shaping a material with a rotating end mill. For example, a laser machining process typically does not rely on a rotating machine tool that can wear out due to continued mechanical contact with the work material. There are a myriad of other advantages known to those of ordinary skill in the art regarding advantages of laser process over other techniques. Processing a work material with a laser can include, by way of example and not limitation, machining, cutting, marking, printing, drilling, ablating, vaporizing, heat treating, such as hardening or annealing, as well as many other operations.

However, optimal processing of a material with a laser can require the appropriate selection of laser processing parameters, of which there are several, and each different material can require a different combination of those parameters. Laser processing parameters can include, by way of example and not limitation, wavelength, average power, beam quality, beam spot size, beam divergence, relative traverse speed to the work material, and whether the beam is pulsed or continuous wave (CW). Pulsed beams are extremely useful and often used in laser processing, as they can help ablate and hence remove material while avoiding undue and deleterious heating. However, pulses involve even additional parameters, such as, for example, temporal pulse shape, temporal pulse duration (also referred to herein as pulse width or temporal pulse width), pulse repetition frequency (PRF), energy of the pulse, peak power (PP) of the pulse and spectral bandwidth of the pulse, to name a few.

Unfortunately, establishing a useful laser processing window for processing a particular material can be a largely empirical process involving a fair amount of trial and error and variation of many of the above laser processing parameters. There is typically no comprehensive theoretical approach involving analytical or numerical solutions that allow determination or optimization of the proper processing parameters for processing a particular material. Unfortunately, such variation, if properly empirically explored, can require the use of many different types of lasers, as one laser type is often quite limited in the range of processing parameters that can be varied. The several types of lasers, such as, for example, gas lasers (e.g., $CO_2$ lasers), bulk solid state lasers (e.g. Nd-YAG lasers), semiconductor (e.g., diode lasers) and fiber lasers, as well as different architectures (mode locked, Q-switched, seeded (e.g., by laser diode master oscillator)) and methods of implementation (passive or active mode locking or Q-switching, particular mode locking or Q-switching element), not to mention, perhaps most importantly, the particular active material (e.g., Yb, Nd, Er or Er/Yb, which are often used in the case of fiber lasers) can result in a complex matrix of laser types and implementation details versus resultant capabilities in terms of the aforementioned processing parameters. Even within a given type of laser in which much of the structure is the same, varying a processing parameter can mean procuring a physically different laser. For example, in a mode locked laser the PRF is often a function of the round trip time of light traversing, and hence the physical length of the laser resonant cavity, which is typically fixed for a given physical implementation of a laser. As a further impediment to a full or efficient exploration of a processing window for the laser processing of a material, many of the lasers noted above can be quite expensive and/or large.

It would be a welcome advance in the art to simplify the matrix and to obtain a wider range of operating parameters from a smaller selection of particular lasers or laser types. For example, regarding pulsed lasers providing temporal pulse widths in the high femtosecond to low nanosecond regime (e.g., picosecond pulses), it would be of interest if one or more of the pulse parameters (e.g., PRF, temporal pulse width, pulse energy, pulse PP, etc.) could more readily be varied.

Accordingly, it is an object of the present disclosure to address one or more of the foregoing disadvantages or drawbacks of the art of laser processing of a work material. Other objects will be apparent from a study of the remainder of the present disclosure, including the drawings and claims.

SUMMARY OF THE DISCLOSURE

In one aspect, the disclosure provides a method of operating a pulsed laser system so as to allow the time duration of output optical pulses from the laser system to be tuned, comprising: providing a laser system that provides an optical output pulse having a selected temporal pulse width at least in part due to the providing of spectral dispersion that introduces a change in temporal pulse width responsive to the spectral bandwidth modification of seed pulses; and providing a second output pulse having a desired temporal pulse width that is different than the selected temporal pulse width from the laser system by changing at least one of the amount of spectral bandwidth modification or the amount of spectral dispersion so as to provide a different amount of pulse width change than that used to generate the pulses having the selected temporal pulse width.

Output pulses from the laser system can have time durations that are longer than the seed pulse associated with the output pulse. In one practice seed pulses absent the spectral modification thereof have a spectral bandwidth of no greater than 2 nm and a temporal bandwidth of no less than 1 ps and no greater than 100 ps. In another practice, output pulses provided by the laser system have a temporal time duration of no less than 1 ps and no greater than 1 ns, such as, for example, when the spectrally unmodified seed pulses have a spectral bandwidth of no greater than 2 nm and a temporal bandwidth of no less than 1 ps and no greater than 100 ps. Spectral modification can comprise spectral broadening, adding, in one practice of the disclosure, no more than 2 or 3 nm to the spectral bandwidth.

Changing the amount of spectral bandwidth modification or changing the amount of spectral dispersion can comprise changing the amount of spectral bandwidth modification, and changing the amount of spectral bandwidth modification can comprise changing an optical power of a seed pulse. Changing an optical power can comprise attenuating or amplifying. The method can include providing a pulsed laser source for generating the seed pulses and changing the optical power can comprise changing the output power of the pulsed laser source, or changing the gain or the attenuation of, respectively, a downstream amplifier or attenuator. Changing the amount of spectral bandwidth modification can comprise changing an amount of self phase modulation, and changing an amount of self phase modulation can comprise providing an amplifier and changing the gain of the amplifier.

In one practice, the method can comprise providing a laser source for providing the seed pulses, the laser source comprising a passively mode locked fiber laser comprising a laser cavity including a SESAM mode locking element and a length of rare earth doped optical fiber, which can have normal dispersion at the output wavelength of the fiber laser cavity. In one practice, the passively mode locked fiber laser provides the seed pulses having a time duration of no less than 1 ps and no greater than 100 ps. Alternatively or additionally, the seed pulses have a spectral bandwidth of no greater than 2 nm and bandwidth modification can include changing the spectral bandwidth external to the laser cavity.

In another practice, the method can comprise providing a laser source for providing the seed pulses, where the laser source comprises a passively mode locked fiber laser comprising a laser cavity including a SESAM mode locking element and a length of rare earth doped optical fiber, and spectral bandwidth modification can be provided by a non linear fiber amplifier downstream of the laser source, and changing the amount of bandwidth modification can comprise changing the gain of the fiber amplifier to change an amount of self-phase modulation provided by the non linear amplifier.

Providing spectral dispersion can comprise providing an appropriate spectrally dispersive optical element, such as, for example, providing a chirped fiber Bragg grating and reflecting optical energy from the chirped fiber Bragg grating.

Changing the spectral bandwidth or changing the amount of spectral dispersion can comprise changing the amount of spectral dispersion. Changing the amount of spectral dispersion can comprise changing the strain under which a fiber Bragg grating operates. Changing the amount of spectral dispersion can comprise providing first and second spectrally dispersive optical elements that provide different amounts of spectral dispersion; and changing from providing spectral dispersion with the first spectrally dispersive element to providing spectral dispersion with the second spectrally dispersive optical element.

Changing the amount of spectral bandwidth modification or changing the amount of spectral dispersion can comprise changing both the amount of spectral bandwidth modification and the amount of spectral dispersion, and the method can include providing at least one criteria related to a pulse characteristic and determining to change both the amount of spectral dispersion and the amount of spectral bandwidth modification responsive to a determination regarding the at least one criteria. The pulse characteristic can comprise the desired temporal pulse width of the second pulse. Alternatively or additionally the pulse characteristic can comprise pulse distortion.

In one practice, the method can comprise changing both of the amount of spectral bandwidth modification and the amount of spectral dispersion so as to provide substantially continuous tuning of the temporal pulse width of output pulses of the laser system over a selected range of temporal pulse widths and so as to limit the amount of distortion of output pulses having temporal pulse widths within the selected range.

Typically the output pulses from the laser system will have longer time durations than the seed pulses, and in various practices of the disclosure the output pulses can demonstrate a percentage change in the pulse duration tunability that can range to as much as 100%, 200%, 300%, 500% or even 1000%. That is, the laser can provide one output pulse having a time duration that is 500%, for example, of the time duration of another output pulse. The laser system, in some practices, can provide substantially continuous tuning of the time duration of the output pulses over one or more of the foregoing ranges. Percentage variation can be determined by subtracting the shorter pulse width from the longer and dividing by the shorter.

In various practices of the disclosure, seed pulses have a spectral bandwidth of no greater than 5 nm, no greater than 3 nm, no greater than 2 nm, or no greater than 1 nm. In various practices of the invention, the seed pulses have a temporal bandwidth no less than 1 ps and no greater than 100 ps and, by way of example and not limitation, in conjunction with the foregoing the seed pulses typically have a spectral bandwidth of no greater than 2 nm, or, as may be more likely, no greater than 1 nm.

In another aspect, the disclosure provides a method for allowing the time duration of an output pulse of a pulsed fiber laser system to be changed, the method comprising: providing a pulsed laser source; generating an optical pulse with the pulsed laser source, the optical pulse having a first time duration; changing the optical power of the optical pulse; stretching the optical pulse having the changed optical power to increase the time duration thereof, thereby providing the output pulse; and wherein the amount of increase in time duration is responsive to the variation of the optical power and wherein the amount of change in the optical power of the optical pulse and can be varied, thereby providing a pulsed laser system that can provide an output optical pulse having a time duration that can be tuned via variation of the optical power.

In a further aspect, the disclosure provides a method of producing an output pulse from a laser system, comprising: providing a pulsed laser (e.g., a mode locked pulsed fiber laser, such as passively mode lock fiber laser based on a SESAM mode locking element) providing pulses having a spectral bandwidth and a selected time duration (e.g., the selected time duration being no less than 1 ps and no greater than 100 ps); changing the spectral bandwidth of the optical pulses downstream of the pulsed laser by causing the pulses to undergo self phase modulation; spectrally dispersing the optical pulses having the changed spectral bandwidth so as to change the time duration thereof by an amount that is responsive to the change in spectral bandwidth; and providing output pulses having a time duration that is different from the selected time duration responsive to the changing of the spectral bandwidth and spectral dispersion. Providing the output pulses can include refraining from any compressing of the output pulses that would cause their time duration to be less than a selected percentage, such as, for example 75%, 50%, or 25% of the time duration of the output pulses prior to compression.

In another aspect, the disclosure provides a method for providing output laser pulses from a laser system, such as, for example, a fiber laser system, wherein output laser pulses having different time durations can be provided from the laser system, comprising: providing a pump source of pump optical energy; providing a plurality of fiber laser cavities, the fiber laser cavities being adapted and constructed to output laser pulses wherein the time durations of the output pulses provided from different fiber laser cavities can be different; providing optical communication between a first of the laser cavities and the pump source and between the first of the laser cavities and an output for providing an output pulse having a first time duration from the laser system; and providing optical communication between a second of the laser cavities and the pump source and between the second of the laser cavities and the output wherein an output pulse having a second time duration that is different than the first time duration is provided. The laser system can be constructed and adapted such that the output pulses have ultrashort time durations. A laser cavity can comprise a mode locked laser cavity, such as, for example, mode locked cavity using a SESAM mode locking element. The laser cavity can include a length of rare earth doped optical fiber that provides normal dispersion (which is understood to correspond to positive velocity dispersion (GVD)—as one of ordinary skill understands, the sign is reversed when referring to GVD instead of normal and anomalous dispersions) at the wavelength of operation of the laser cavity, which can be, for example, about 1 μm, when, for example, the rare earth material comprises ytterbium as the active material.

In another aspect, the disclosure provides a method of providing a plurality of lasers wherein a first laser provides optical output pulses having a temporal pulse width that is different than the temporal pulse width of optical output pulses provided by a second laser, comprising: procuring (e.g., fabricating or obtaining) a first laser, where the first laser outputs pulses having a selected temporal pulse width at least in part because of a process of spectral dispersion that introduces a selected change in temporal pulse width responsive to an amount of spectral bandwidth modification of seed pulses; learning that another laser is desired having output pulses having a desired temporal pulse width that is different than the selected temporal pulse width; and procuring the other laser, where the other laser outputs pulses having the desired temporal pulse width also at least in part because of a process of spectral dispersion that introduces a change in temporal pulse width responsive to an amount of spectral bandwidth modification of seed pulses, where the procuring of the other laser includes procuring the other laser where at least one of the amount spectral bandwidth modification or the amount of spectral dispersion is adjusted to be different from that of the first laser so as to provide an amount of temporal pulse width change that is different than the selected change in temporal pulse width provided in the first laser.

In yet an additional further aspect, the disclosure teaches a method of laser processing one or more target regions of one or more work pieces with a fiber laser that can provide pulses having different pulse energies and temporal pulse widths in a manner that addresses limitations regarding undesirable non linear effects, such as SRS, that can occur during the amplification of high energy pulses. The method can comprise: providing an optical fiber laser for providing optical output pulses (such as, for example, ultrashort pulses), where the optical fiber laser can include an optical fiber amplifier having a length of active optical fiber and the optical fiber amplifier can have associated therewith an optical power threshold related to the onset of stimulated Raman scattering ("Raman threshold"); amplifying a first optical pulse (e.g., an ultrashort pulse) with the optical fiber amplifier, the first optical pulse leaving the length of active fiber of the optical amplifier with a first pulse time duration and a first pulse energy; directing, downstream of the amplifier, an output optical pulse to a first target region to process the first target region with a first amount of pulsed processing optical energy that is responsive to the fiber pulse energy; learning that it is desirable to process the first target region or a different target region with a different optical pulse (e.g., an ultrashort or ultrafast pulse) carrying a second amount of processing optical energy that is different than the first amount of pulsed processing optical energy; amplifying another optical pulse with the optical fiber amplifier such that the another optical pulse leaves the length of active optical fiber having a selected pulse energy that is different than the first pulse energy and a selected pulse time duration that is different than the first pulse time duration, where the selected pulse duration and energy are such that the peak power of the another optical pulse does not exceed the Raman threshold but wherein the peak power of a hypothetical pulse having the higher of the selected and first pulse energies and the shorter of the selected and first pulse time durations of the pulses would have a peak power exceeding the Raman threshold; and directing, downstream of the amplifier, the another optical pulse to the first or second target region for the processing thereof, with another pulse power energy that is responsive to selected pulse energy and that is different than the first amount of pulsed processing energy. The first optical pulse can comprise a pulse of a burst of pulses, one or more, such a majority or nearly all, of which that are substantially similar to the first optical pulse, and the another optical pulse can comprise a pulse of a differed burst of optical pulses, one or more, such a majority or nearly all, of which can be substantially similar to the another optical pulse.

In another aspect, the disclosure teaches a method for tuning the time duration of output pulses from a laser system, where the method includes spectrally dispersing optical pulses and further comprises providing an optical pulse having a time duration and a spectral bandwidth; spectrally dispersing the optical pulse so as to provide a selected change in the time duration of the pulse responsive to the spectral bandwidth of the pulse; outputting an output pulse having a first time duration that is responsive to the selected change in time duration; providing another optical pulse; changing the spectral bandwidth of the another optical pulse to be different than that of the optical pulse or changing the amount of spectral dispersion so that spectrally dispersing the another optical pulse provides a change in time duration that is different than the selected change; and outputting another output pulse having a second time duration that is responsive to the different change in time duration, the second time duration of the another optical pulse being different than the first time duration of the output pulse.

The present disclosure also teaches apparatus and systems, such as, for example, apparatus and systems for practicing the methods above and that may incorporate one or more features of the methods noted above. By way of example and not limitation, certain examples of such apparatus and systems are now provided.

In one aspect, the disclosure teaches a laser system comprising a pulsed laser source for originating seed pulses (e.g., a mode locked pulsed laser, such as a passively mode locked fiber laser based on a SESAM mode locking element) that can provide pulses having a spectral bandwidth and a selected time duration (e.g., a spectral bandwidth of 1 nm or less and selected time duration no less than 1 ps and no greater than 100 ps); a non linear optical waveguiding structure for providing spectral bandwidth modification; and a spectrally dispersive optical element downstream of the nonlinear optical waveguiding structure, where the spectrally dispersive optical element introduces a change in time duration of received pulses responsive to both the amount of spectral bandwidth modification and the amount of spectral dispersion provided by the spectrally dispersive optical element. The nonlinear waveguiding structure can provide spectral bandwidth modification via a selected non linear process, such as, for example, self phase modulation.

Nonlinear effects, such as self phase modulation, can occur in a waveguiding structure when the optical intensity is sufficiently high, which can be accomplished by appropriately configuring the waveguiding structure, such as, in the case of an optical fiber, providing a single mode fiber including a material conducive to nonlinear effects (e.g., silica) which can have a smaller core diameter and/or a higher NA for tending to reduce the mode field diameter of the fundamental mode and hence concentrate the optical energy. The nonlinear optical waveguiding structure can comprise passive optical waveguide, such as a length of passive optical fiber, or an active optical waveguide, such as, for example, a length of active optical fiber. The active optical fiber can comprise, for example, a rare earth doped optical fiber that provides optical gain responsive to the length of active optical fiber receiving optical pumping energy. The nonlinear optical waveguiding structure can comprise an optical fiber amplifier that comprises the length of active optical fiber.

The spectrally dispersive optical element can comprise a chirped fiber Bragg grating, and the laser system can be adapted and constructed, such as by using a circulator, such that the chirped fiber Bragg grating provides spectral dispersion upon the reflection of pulsed optical energy from the grating.

The laser system can refrain from any compressing of the output pulses that would cause their time duration to be less than a selected percentage, such as, for example 75%, 50%, or 25% of the time duration of the output pulses prior to compression.

Typically the laser system is configured such that one or both of the amount of spectral bandwidth change or the amount of spectral dispersion can be selectively changed for selectively changing the time duration of the pulses downstream of the spectrally dispersive optical element, thereby providing a tunable pulse width laser system. The laser system can comprise a controller. For example, the laser system can comprise a controller for controlling the gain of the amplifier, thereby controlling the amount of self phase modulation and the amount of spectral bandwidth modification. Where the nonlinear optical waveguiding element comprises a passive optical waveguide, the laser system can comprise a variable optical attenuator for changing the self phase modulation introduced by the passive optical waveguide, and the controller can control the variable optical attenuator for controlling the attenuation and hence the amount of spectral bandwidth modification. The controller can thus control the time duration of output pulses.

In another aspect, the disclosure teaches a laser system, such as, for example, a fiber laser system, for producing output laser pulses having different time durations, comprising: a pump source of pumping optical energy; a plurality of laser cavities, the laser cavities being adapted and constructed to output laser pulses wherein the time durations of the output pulses provided from different laser cavities can be different; a combiner, such as a switch, in optical communication with the pump source of pumping optical energy and the plurality of laser cavities for selectably directing pumping optical energy to the laser cavities; a combiner, such as a switch, in optical communication with the plurality of the laser cavities for directing optical energy from the laser cavities to the output. As is discussed elsewhere herein and will be evident to one of ordinary skill reviewing the disclosure, one or more of the laser cavities can comprise a mode locked ultrafast fiber laser cavity, which can, for example, comprise a SESAM at one end for mode locking the fiber laser cavity as well as a fiber Bragg grating optically spaced from the SESAM, such as by a length of rare earth doped optical fiber, which can have normal dispersion at the operating wavelength of the cavity. The cavity can include a dispersive element for adjusting the overall dispersion of the laser cavity.

BRIEF DESCRIPTION OF THE DRAWINGS

FIG. 4 schematically illustrates a possible architecture for the combiner of FIG. 2;

FIG. 5 schematically illustrates an additional embodiment of a tunable temporal pulse width laser according to the present disclosure;

FIG. 24A is a chart schematically illustrates steps that can be included according to one practice of the present disclosure for providing different temporal pulse width pulses from the same laser;

FIG. 24B is chart schematically illustrating steps that can be included according to one practice of the present disclosure for providing a plurality of lasers wherein each laser provides output pulses having a temporal pulse width that is different than the temporal pulse width of the output pulses provided by the other lasers; and FIG. 25 is a diagram of steps that can included in one practice of the disclosure for laser processing one or more target regions of one or more work pieces with a fiber laser that can provide output pulses having different pulse energies and temporal pulse widths.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1:
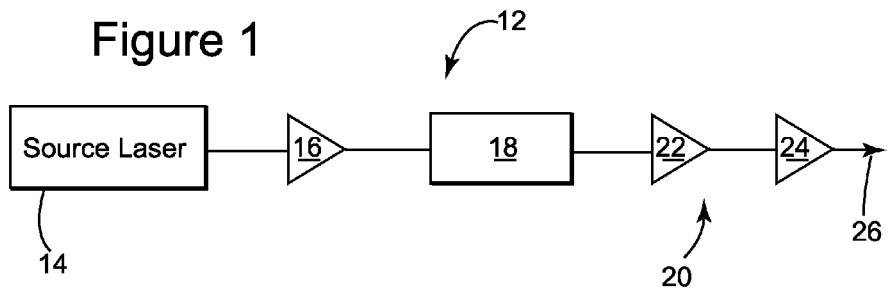
FIG. 1 schematically illustrates a tunable temporal pulse width laser according to the present disclosure.

FIG. 1 schematically illustrates one embodiment of a tunable temporal pulse width laser 12 according to the present disclosure. The tunable temporal pulse width laser 12 can include a tunable source laser 14, a preamplifier 16, a modulator 18, which can be configured as a pulse picker, and cascade of amplifiers 20, which cascade 20 can include the amplifiers 22 and 24. Typically the amplifier 24 is the most downstream amplifier of the tunable temporal pulse width laser 12 and is configured as a power amplifier. The tunable temporal pulse width laser 12 can comprise an output, indicated schematically on FIG. 1 by arrow 26, for outputting the pulses. In various practices of the disclosure, the tunable source laser 14 and/or the tunable temporal pulse width laser 12 can produce fast, ultrafast or ultrashort pulses, wherein the time duration of the pulses from the source laser (and hence of the output pulses 26 of the laser 12) can be changed, such as by being changed responsive to user instruction (where "user" can include a controller, such as, for example, a microprocessor or computer). As the terms are used herein, "fast" means a pulse duration of ≤1 nanosecond (ns); "ultrafast" means pulse duration of ≤1 picosecond (ps); and "ultrashort" means a pulse duration of ≤1 ns but ≥1 ps.

"Tunable", as that term is used herein as regards temporal pulse width, refers to changeable temporal pulse width where the change may be a continuous change over a selected range of temporal pulse widths, but more generally can include the provision of a plurality of fixed temporal pulse widths that can be selected by a user as well as limited tunability over each of selected bands, where not all the bands abut or overlap, as well as any combination of the foregoing (e.g., the user can select continuous tuning over one range or band as well as one or more relatively fixed wavelength outputs outside of the band or range).

The modulator 18 can be configured to "pulse pick" to reduce the repetition rate of the pulses originating from the source laser 14 and can be located, as shown in FIG. 1, upstream of the amplifier cascade 20. Pulse picking before amplification avoids unduly wasting power, as the picked pulses are attenuated or redirected before, rather than after amplification, as one of ordinary skill in the art, appraised of the present disclosure, will appreciate. The modulator can comprise an acousto-optical modulator (AOM), which is a well known component to the ordinarily skilled worker in the art. Other types of modulators can also be used, such as, for example, an electro-optical modulator, a modulator based on a saturable absorber semiconductor mirror or any other type of suitable fast modulation device. The modulator 18 is preferably capable of switching with rise times of less than one microsecond. The modulator 18 is typically synchronized to the source laser 14 PRF and is operable to gate the pulsed output thereof down to a repetition rate of a few tens of KHz, and hence pulse-pick the pulses, thereby providing a selectable pump pulse frequency Rr=PRF. In certain practices of the invention the modulator 18 can be configured to perform other functions in addition to or instead of pulse picking. For example, an AOM can be configured to selectively attenuate pulses in a pulse train, or to filter out or redirect pulses having different fundamental wavelengths.

Although variations are possible regarding design and operation of the source laser 14 and other components of the tunable temporal pulse width laser 12, as is discussed in more detail below, some typical exemplary operational parameters and features of one example of the tunable temporal pulse width laser 12 are briefly discussed. The source laser 14 can operate at a pulse repetition frequency (PRF) of at least between about 20 MHz and 100 MHz, with an average output power in the mW range. The preamplifier 16 can have a gain of less than 20 dB, and an average output power in, as one example, the range of 100 mW. The preamplifier 16 and amplifier 22 can be of substantially similar construction and have similar operational parameters. Both can comprise fiber amplifiers based on, for example, optical fiber having a single mode (SM), low numerical aperture (0.07-0.08 NA) Yb doped core (one to a few dB/meter absorption in the 915 nm band) and a 125 μm diameter inner cladding. Higher NA's, such as are common with standard telecom SM fibers may also be used. The fibers can be double clad and the amplifiers each pumped with a few Watts of power from single emitter laser diodes coupled to the inner cladding via the tapered fiber bundle optical couplers. Both can be configured to provide around 20 dB of gain. Average output powers from the preamplifier 16 and amplifier 22 can be in the 100's to over 1000 Watts, amplifier 22 can have an average output power that is near that of the preamplifier (because of the reduction of pulse rate due to the pulse picking by the modulator 18). The amplifier 22 does increase, or course, the energy per pulse over the pulses output from the preamplifier 16. The modulator 18 can, for example, pulse pick such that the PRF into the amplifier 22 is about 200 KHz to 1 MHz The amplifier 24 can be configured as a power amplifier, and can be based, for example, on "large mode area" (LMA) optical fiber. Though there is no strict definition as to exactly what constitutes LMA fiber, such fibers are typically characterized by a core having a reduced NA and an increased diameter. For example, the amplifier 24 can be based on one to a few meters of an active optical fiber having a Yb doped core (Yb doping sufficient for one to a few dB absorption in the 915 nm band) having a 20 μm diameter and an NA of about 0.07 to 0.09. Such a fiber can provide the amplifier with an output power of, for example, 6 Watts and pulses having a pulse energy of, for example, 7 μJ and a peak power (PP) of 150 kW. The amplifier 24 typically provides less than 25 dB of gain. It can be desirable to operate the tunable temporal pulse width laser 12 such that the PP of pulses amplified by the laser amplifier in the cascade is clamped to not exceed a certain value, such as, for example, not to exceed a PP of 150 kW noted above. The clamping PP value can be selected to avoid exceeding a threshold value where undesirable optical phenomena, such as Raman phenomena, would occur to an extent to be detrimental to the performance of the tunable temporal pulse width laser 12 or to the application process in which the output pulses from the tunable temporal pulse width laser are to be used. This threshold value can be determined empirically on a case by case basis. Often the peak power of pulses in the power amplifier should not exceed about 150 kW as the threshold value.

The tunable temporal pulse width laser can be fabricated with polarization maintaining (PM) optical fibers.

Figure 2:
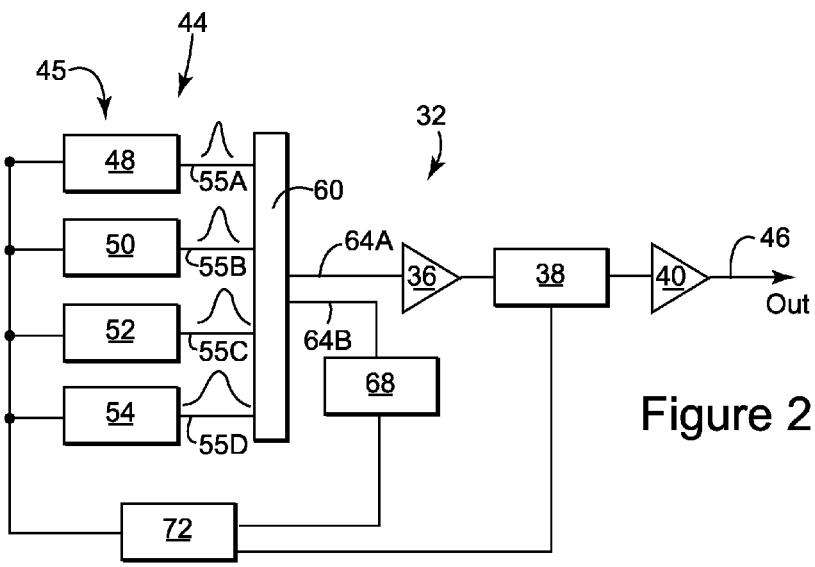
FIG. 2 schematically illustrates another embodiment of a tunable temporal pulse width laser according to the present disclosure.

FIG. 2 schematically illustrates one embodiment of the tunable temporal pulse width laser 12 of FIG. 1. FIG. 2 shows a tunable temporal pulse width laser 32 including, as in FIG. 1, a preamplifier 36 and modulator 38 configured to pulse pick. Also shown is the power amplifier 40, though an amplifier cascade, such as the amplifier cascade 20 of FIG. 1, which includes the power amplifier 40, is also suitable. The tunable temporal pulse width laser 32 comprises a source laser 44 that includes a plurality of individual source lasers 45, which in the embodiment of FIG. 2 includes individual source lasers 48, 50, 52 and 54.

The combiner 60 combines the outputs 55A, 55B, 55C and 55D of the plurality of individual lasers 45 such that pulses from the individual lasers selected for operation by the controller 72 is delivered via the output 64A of the combiner to the preamplifier 36. The combiner 60 can include a second output 64B in optical communication with a photodetector 68, which is in turn in communication with the controller 72. The controller 72 can, responsive to communication with the photodetector 68, provide an appropriate signal to the modulator 38 for appropriately synchronizing the pulse picking of the modulator 38 with the timing of the output pulses of the individual lasers for effective reduction of the repetition rate. Each of the individual lasers of the plurality of lasers 45 is typically relatively independent, and comprises its own power supply and optical pump energy source.

The individual lasers 48, 50, 52 and 54 can have different optical characteristics and the controller 72, by selecting which individual laser to operate, can provide an output 46 having the selected characteristic. Typically the individual lasers 48, 50, 52, and 54 can provide laser pulses having different temporal pulse widths such that the controller, by selecting which individual laser to operate, can provide an output 46 wherein the temporal pulse width can be changed. One or more of the individual lasers 48, 50, 52, and 54 can have a fixed temporal pulse width, meaning that it produces a laser pulse having a relatively fixed temporal pulse width that is not readily changed by a user. For example, in one practice of the invention, individual laser 48 can provide a 10 ps pulse width, individual laser 50 can provide a 20 ps pulse width, individual laser 52 can provide a 30 ps pulse width, and individual laser 54 can provide a 40 ps pulse width. Selection of which individual laser to operate determines the temporal pulse width of the pulses provided at the output 46 to the tunable temporal pulse width laser 32. "Pulse width" or "time duration" of a pulse, as those terms are used herein, refers to temporal pulse width as measured by the full width half maximum (FWHM) technique. (Spectral bandwidth is also determined according to the FWHM technique). The controller 72 can provide a trigger input, such as via a TTL signal, to one or more of the individual lasers (typically just one individual laser at a time is selected) to select that laser for operation. The individual lasers could comprise some features in common, such as, for example, a common power supply (not shown).

Although FIG. 2 shows four individual lasers, one of ordinary skill in the art, informed of the disclosure herein, will recognize that the embodiment of FIG. 2 is not limited to any one particular number of individual lasers, and that the depiction of the four individual lasers 48, 50, 52 and 54 is exemplary. Typically, one or more of the individual lasers 48, 50, 52 and 54 will comprise a mode locked fiber laser, though, as one of ordinary skill reading the disclosure can determine, the invention is not limited to any one type of source laser, and other types of individual lasers, such as, for example, diode pumped solid state laser (DPSS) individual lasers, can be used in certain practices of the invention.

Figure 3:
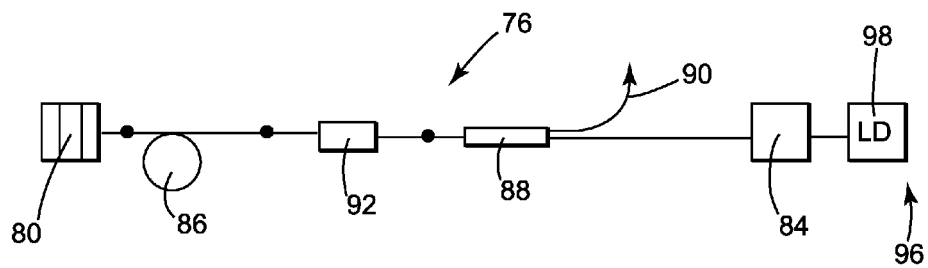
FIG. 3 schematically illustrates a possible optical architecture for one of the individual laser sources of the tunable temporal pulse width laser of FIG. 2.

FIG. 3 schematically illustrates a possible optical architecture for one or more of the plurality 45 of individual source lasers. The laser 76 can comprise a passively mode locked fiber laser (PMLFL) that includes a laser cavity comprising a fiber coupled semiconductor saturable absorber mirror (SESAM) 80 at one end of the cavity and a second reflector 84, which can comprise, for example, a fiber Bragg grating (FBG), at the other end of the cavity. The laser cavity can also include a length of active fiber 86, such as, for example, a length of rare earth doped (RED) optical fiber and a coupler 88 for providing the output 90 from the PMLFL 76. The SESAM 80 is typically fiber coupled and a length of passive fiber, not shown, is interposed between the SESAM 80 and the length of active fiber 86. The pump source 96 can comprise a single emitter laser diode 98 operating in the 980 nm absorption band of ytterbium and providing an output power in the range of hundreds of mW, and can pump the laser cavity through the FBG reflector 84, which can be transmissive at the pump wavelength. The length of active fiber 86 can comprise a short length (e.g., tens of cm's) of single mode (SM) ytterbium-doped fiber, having, for example, a core diameter of 4-5 μm, a cladding diameter of 125 μm, and a concentration of Yb disposed in the core of the fiber for providing, for example, an absorption of about 300 dB/meter in the 980 nm band. The PMLFL 76 can output, for example, a pulse width of a few to tens of ps, a center wavelength of 1064 nm, and operation at PRF of 20 MHz The pulses can have an energy in the pJ range and the average power of the PMLFL 76 can be in the range of a few to a few tens of milliwatts.

Design considerations for fabricating a PMLFL are fairly well established in the art, and accordingly, not all details of the design of the PMLFL 76 are provided herein. The temporal pulse width and PRF of pulses provided by the PMLFL are a function of, among other factors, the properties of the SESAM, the round trip propagation time for a pulse traversing the cavity, as well as the overall dispersion of the cavity. The length of the active fiber 86 can be selected to adjust the round trip propagation time of the cavity. For operation at a wavelength of 1064 nm, where a typical optical fiber provides normal as opposed to anomalous dispersion, the PMLFL 76 can include a spectrally dispersive element 92 for providing the laser cavity with an appropriate overall dispersion. For example, the spectrally dispersive element 92 can comprise a length of optical fiber having an appropriately selected dispersion characteristic, or a grating pair with appropriate provision for coupling optical energy between the grating pair and the optical fiber of the laser cavity. The spectrally dispersive element 92 can provide, for example, a dispersion of about −10 ps/nm at the operating wavelength of the PMLFL.

Regarding the use of a length of fiber, it is well known that both material dispersion and waveguide dispersion can contribute to the overall spectral dispersion provided by an optical fiber. Accordingly, appropriate selection of one or both of the foregoing, and most typically of the refractive index profile and/or the geometry of the fiber (e.g., core size), both of which can provide a selected waveguide dispersion contribution, it is often possible to design an optical fiber that can provide a selected spectral dispersion characteristic. Non-zero dispersion-shifted fiber (NZDSF) is a well known example from the telecom environment. The required refractive index profiles can be rather involved, however.

Note that in an alternative embodiment of the PMLFL 76, the grating 84 can comprise a chirped fiber Bragg grating (CFBG) for providing the cavity with the appropriate overall dispersion, and can also be partially transmissive at the operating wavelength of the PMLFL such the cavity output is through the grating 84. In this instance the pump optical energy need not be provided to the laser cavity through the grating 84 as shown in FIG. 3, but instead reference numeral 88 can represent a WDM coupler for coupling the pump optical energy to the laser cavity (and passing 1064 nm), where reference numeral 90 would represent a WDM input arm to which the laser diode 98 is optically coupled.

FIG. 4 schematically illustrates a possible architecture for the combiner 60 of FIG. 2. As shown in FIG. 4, the combiner 60 can comprise three optical couplers 100A, 100B and 100C, which can comprise fused fiber optical couplers, arranged as shown in FIG. 4. The couplers 100A and 100B receive inputs 55A, 55B, 55C and 55D from individual lasers 48, 50, 52, 54, respectively. Coupler 100C combines an output from coupler 100A with an output from coupler 100B and provides output 64A and 64B, which are directed, respectively, to the preamplifier 36 and the photodetector 68. One drawback of the arrangement shown in FIG. 4 is that the two arms 104A and 104B are not used, and this incurs some loss of power.

FIG. 5 shows an alternative, and perhaps preferred, architecture for the combiner 60. As shown in FIG. 5, the individual lasers 48, 50, 52 and 54 can be in optical communication with the optical switch 116. One suitable optical switch is the Lightbend ("LB") 1×4 fiber optic switch available from Agilitron (15 Cabot Road, Woburn, Mass., USA). The Agilitron LB series 1×4 fiber optic switch redirects incoming optical energy to a selected output fiber using an opto-mechanical configuration activated via an electrical control signal. Latching operation preserves the selected optical path after the drive signal has been removed. The switch can include integrated electrical position sensors, and an electronic driver is available from Agilitron for facilitating control of the switch. The optical switch 116 can have lower optical insertion loss than the arrangement of fused optical fiber couplers shown in FIG. 4, as it avoids power lost to the unused arms 104A and 104B.

The output of the optical switch 116 can be sampled by a tap coupler, such as, for example the optical fiber tap coupler 120 shown spliced to the output of the switch 116 in FIG. 5. The tap coupler 120 can be used to direct optical energy to the photodetector 68, which, as explained in the description accompanying FIG. 2, can provide an electrical signal for facilitating the controller synchronizing the pulsed output from the source laser comprising the individual lasers 48, 50, 52 and 54 with the picking of the pulses by the modulator 38. For simplicity, not all of the structure of the tunable laser of FIG. 5 is shown, such as, for components downstream of the preamplifier 36. Reference can be made to earlier FIGURES, such as, for example, FIGS. 1 and/or 2.

Figure 6:
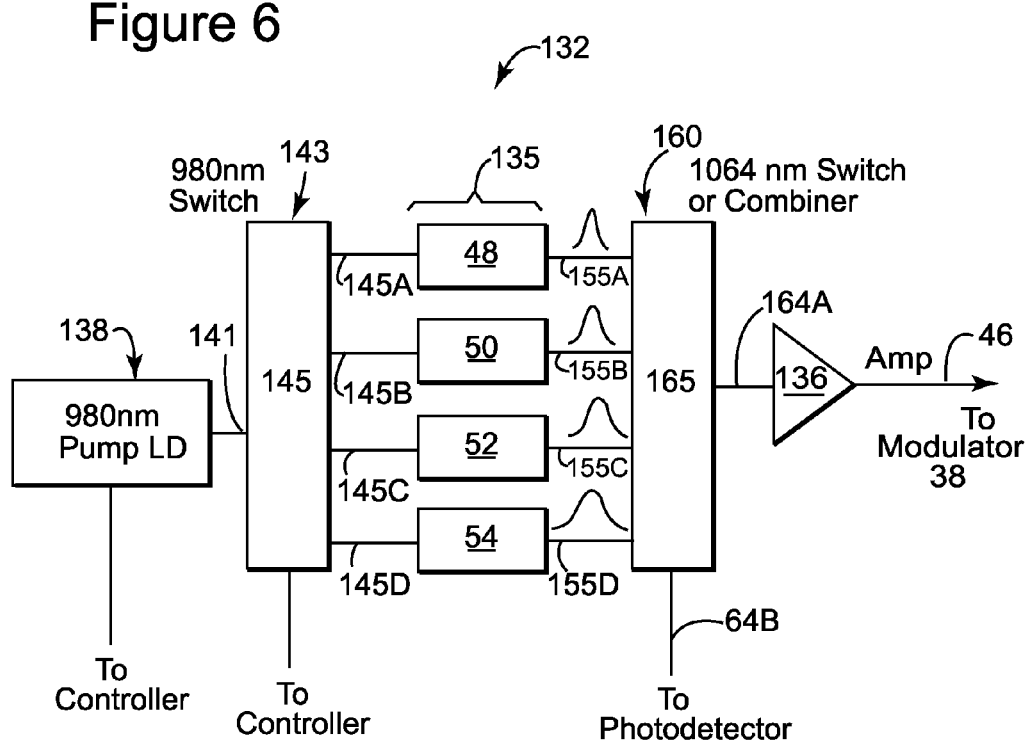
FIG. 6 schematically illustrates a further embodiment of a tunable temporal pulse width laser according to the present disclosure.

FIG. 6 schematically illustrates another embodiment of the tunable pulse width laser 12 of FIG. 1. For simplicity of illustration not all the features shown in FIG. 2 (which also shows an embodiment of a tunable pulse width laser of FIG. 1) are explicitly shown in FIG. 6, such as, for example, the controller 72, photodetector 68, the pulse picking modulator 38, and power amplifier 40 (or amplifier cascade). The preamplifier 36 and output 46 are included for some continuity with FIG. 2.

With reference to FIG. 6, the tunable pulse width laser 132 can comprise a plurality of laser cavities 135 that receive pumping optical energy from a common optical pump source 138. The optical splitter 143 (which can comprise a combiner in "reverse") provides optical communication between the pump source 138 and plurality of optical cavities 135 via input 141 in optical communication with the pump source 138 and optical outputs 155A, 155B, 155C and 155D, each of which can be in optical communication with a different one of the individual laser cavities 148, 150, 152 and 154. Preferably the optical splitter 143 comprises a 1×4 programmable optical switch 145 under control of a controller that facilitates operation of the tunable temporal pulse width laser 132.

As with the individual source lasers 48, 50, 52 and 54, each of the laser cavities can have different optical capabilities, most typically in terms of pulse durations, though of course the design shown in FIG. 6 is more general and can be used to provide a tunable laser wherein features in addition to, or instead of, temporal pulse width are tuned via use of the plurality of laser cavities. For example, in one embodiment, each of the laser cavities is configured to provide optical energy having a wavelength of about 1064 nm, where the optical cavities provide pulses having different temporal pulse widths. For example, laser cavity 148 could be configured to provide 20 ps pulses, laser cavity 150 could be configured to provide 30 ps pulses, laser cavity 152 could be configured to provide 40 ps pulses, and laser cavity 154 could be configured to provide 50 ps pulses. Each of the plurality of laser cavities 135 can incorporate some tunability of the laser temporal pulse width, such that desired bands of temporal pulse widths are provided by the overall pulse width laser 132. A laser cavity of the plurality of laser cavities, can have for example, a pulse repetition rate of 20 MHz, or higher, such as 30 Mhz. The laser cavities can have substantially the same pulse repetition rate, and this will typically be the case.

The optical combiner 160 can combine the outputs 155A, 155B, 155C and 155D into the output 164A, which can be in optical communication with an amplifier or amplifier cascade 136. The optical combiner 160 preferably comprises a 4×1 programmable optical switch 165, which can also be under the control of a controller for facilitating operation of the tunable temporal pulse width laser 132.

One or more of the laser cavities 135 can comprise a mode locked (e.g., passively mode locked) fiber laser cavity, employing, for example, a SESAM mode locking element and a length of RED fiber operating at a wavelength wherein the fiber provides normal dispersion (i.e., positive group velocity dispersion (GVD)), as well as a spectrally dispersive element within the cavity for providing overall cavity dispersion so as to support the generation of soliton or soliton-like pulses. For example, the RED of the active fiber can comprise ytterbium or neodymium and the operating wavelength can be in the range of 1 µm (e.g., 1064 nm).

Figure 7:
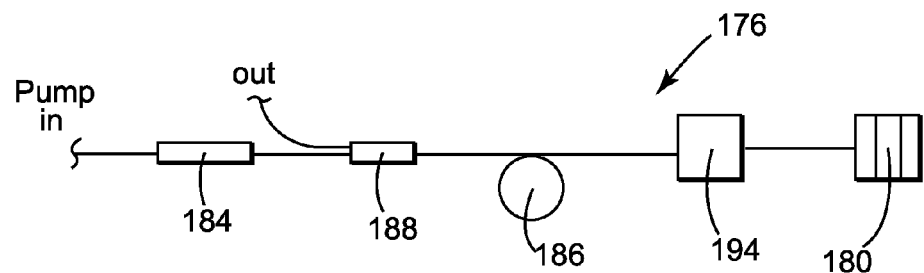
FIG. 7 schematically illustrates a possible architecture for a laser cavity of FIG. 6.

For example, FIG. 7 schematically illustrates a possible architecture for a mode locked fiber laser cavity of FIG. 6. The laser cavity 176 can comprise a passively mode locked fiber laser cavity and can comprise a fiber coupled SESAM 180 for mode locking and providing a reflector at one end of the cavity and a fiber Bragg grating (FBG) 184 for providing a reflector at the other end of the cavity. The FBG 184 can be totally reflective at the wavelength of operation of the laser cavity and transmissive at the pump wavelength (e.g., 980 nm, such that the laser cavity is pumped through the FBG 184). The laser cavity 176 can include an appropriate length of RED optical fiber 186 for providing, in conjunction with the other cavity components, the desired operation in terms of PRF, pulse width, etc. The laser cavity can also include an appropriate spectrally dispersive element 194 for providing a desired total cavity dispersion. Whereas the spectrally dispersive element 194 may be needed when the length of RED operates at a wavelength wherein the fiber typically provides normal dispersion (e.g., at a wavelength of about 1 µm, such as when the fiber is doped with ytterbium or neodymium), if the cavity is intended to operate at a wavelength wherein the fiber provides anomalous dispersion (e.g., at a wavelength of about 1.5 µm, such as when the RED fiber comprises erbium or erbium co-doped with ytterbium), there can be less need for the dispersive element to modify the dispersion of the cavity, and if used it can often modify the dispersion to a lesser amount or even be eliminated.

As one of ordinary skill in the art will appreciate from a reading of the present disclosure, a laser cavity 176 can be very similar to the individual PMLFL 76 described in conjunction with FIG. 3. Design considerations discussed in conjunction with the individual source laser 76 of FIG. 3 can apply to the laser cavity 176 of FIG. 7 and vice versa. For example, the laser cavity 176 can also be designed such that it is pumped via a WDM coupler (i.e., coupler 188 could comprise a WDM coupler and the output arm thereof be an input arm for pump optical energy) and the grating 184 could comprise a CFBG for providing dispersion adjustment of the laser cavity 176. The FBG 184 could also be partially transmissive at the operating wavelength of the laser cavity 176 for providing an output from the cavity.

As part of what is often referred to as the Kerr effect, high optical intensity in a medium can cause a non linear change in the refractive index of the medium, which can in turn lead to a non linear phase delay that depends on the optical intensity of the pulse. Stated in other words, when a medium propagates a high peak power optical pulse, the Kerr effect can cause a time dependent phase shift that varies according to the time dependent pulse intensity. The pulse acquires a so-called chirp, that is, a temporally varying instantaneous frequency. Intensity and hence time dependent phase shift is often referred to as self phase modulation, or SPM, and in propagation in optical waveguides is usually primarily due to the Kerr effect, though other phenomena can also contribute. Although SPM can cause spectral broadening of a pulse, in some circumstances pulses can retain substantially the same bandwidth despite SPM, or SPM can cause spectral compression of a pulse. As one example, where an input pulse having a peak power sufficient to induce SPM in a particular waveguide is substantially unchirped or is up-chirped, the SPM can lead to spectral broadening. However, when an input pulse is downchirped, the SPM can cause spectral compression (assuming, in the foregoing examples, a positive non linear index of refraction).

Other factors may need to be considered as well. For example, in optical fibers having anomalous dispersion, the dispersion of the fiber can compensate for the chirp added by SPM, and this phenomenon is often employed to lead to the formation of solitons, where the spectral width of a pulse remains constant during propagation, despite the SPM effect. Mode locked fiber lasers operating at, for example, about 1.5 nm (a wavelength at which silica fibers can have anomalous dispersion) can make use of the interplay between anomalous dispersion of the fiber and SPM to form soliton output pulses. Mode-locked fiber lasers can also form soliton like pulses, with little or no overall spectral broadening of the pulse, where the fiber has normal dispersion at wavelength of operation but a spectrally dispersive element is added to the laser cavity such that the overall cavity dispersion is anomalous. In such cases increasing the output power of a pulse propagating in or emanating from a laser or amplifier does not necessarily result in spectral broadening of the pulse, even where power levels are such that SPM is occurring.

Although, as noted above, some designs can make use of SPM to generate soliton pulses (e.g., mode locked fiber lasers making use of anomalous dispersion), it is common in the art of laser pulse generation to deliberately avoid amplifying or propagating pulses in a manner that would result in any substantial non linear behavior being involved. For example, in the technique known as "chirped pulse amplification" (CPA), lower power pulses are generated and are deliberately stretched in time prior to amplification so as have a larger temporal pulse width and lower peak power. The stretched pulse is then amplified, but due to the peak power being lowered by the stretching prior to amplification, the amplification process can avoid the peak power of the pulse exceeding a peak power threshold for the generation of a selected non linear phenomenon, such as, for example, SPM. After amplification the pulse can be compressed, such as by a free space grating pair having a spectrally dispersive characteristic that can be largely the opposite to that of the stretcher, to a pulse having a shorter time duration and higher peak power than the pulse had during amplification.

Figure 8:
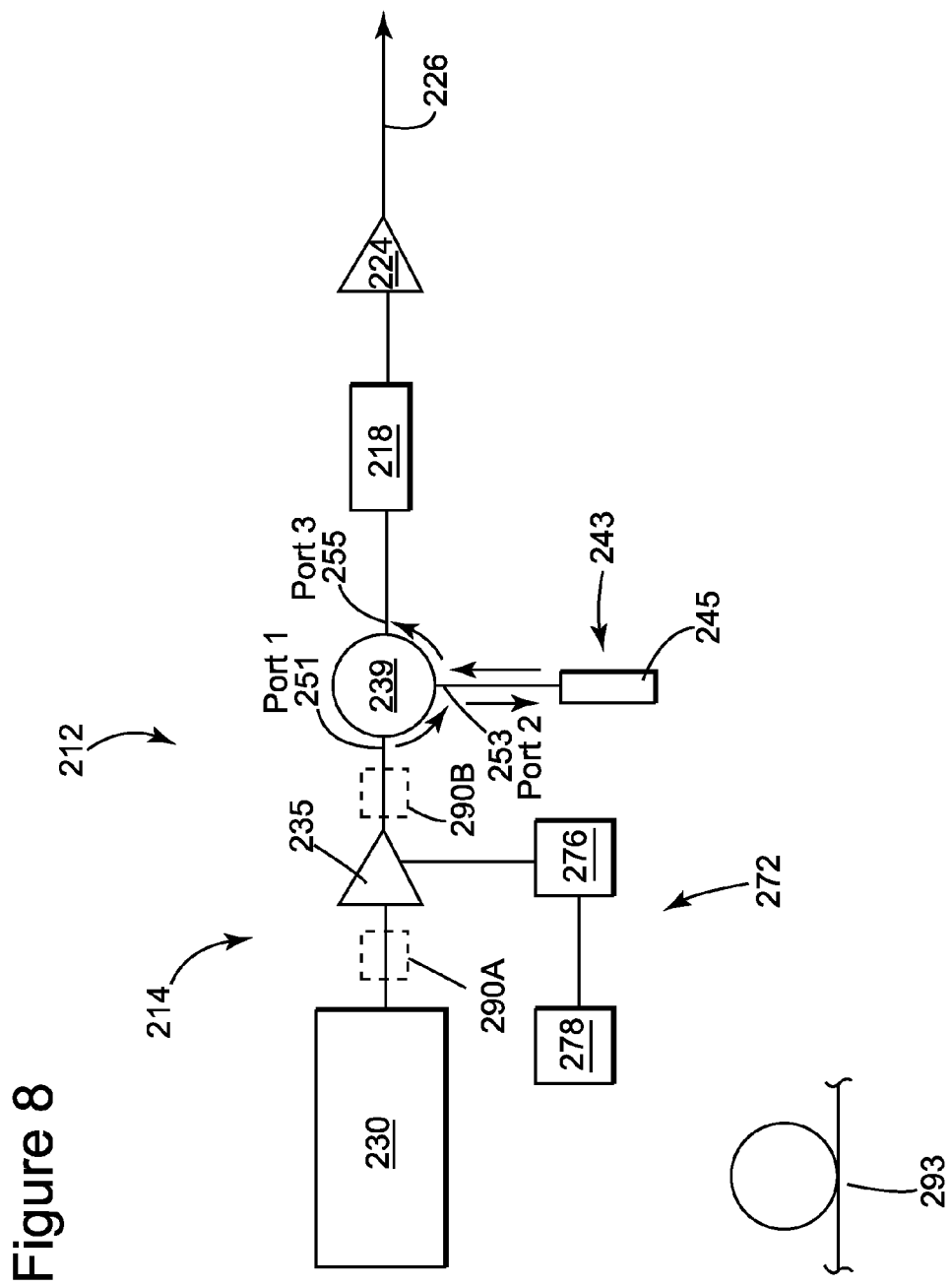
FIG. 8 schematically illustrates yet another embodiment of a tunable temporal pulse width laser according to the present disclosure.

FIG. 8 schematically illustrates yet another embodiment of a tunable temporal pulse width laser according to the present disclosure. The tunable temporal pulse width laser 212 includes a source laser 214, a modulator 218 and at least one amplifier 224. The source laser 214 can include a pulsed laser 230, an amplifier 235 downstream of the laser 230, a circulator 239 and a spectrally dispersive element 243.

The laser 230 can comprise a PMLFL that is based on a SESAM mode locking element, such as, for example the type of PMLFL 76 shown in FIG. 3. The tunable pulse width laser 212 can include a controller 272 that can include a processing unit 276 as well as a user interface 278, which can include, for example, a keyboard, mouse and display for receiving instructions from a human user or other component or assembly of components that provides an interface for receiving user instructions.

The tunable temporal pulse width laser 212 can comprise a waveguiding structure, such as the amplifier 235, which can be constructed and arranged so as to subject pulses to SPM. The SPM can modify the spectral bandwidth of the pulses (e.g., broaden the spectrum of the pulses) with the amount of modification being a function of the peak power of the pulses, and hence a function of the gain of the amplifier 235. The circulator 239 directs amplified pulses received at port 1, indicated by reference numeral 251, to the spectrally dispersive element 243, which in the embodiment shown in FIG. 8 comprises a CFBG, indicated by reference numeral 245. Pulses reflected from the CFBG 245 are received at port 2 of the circulator 239, indicated by reference numeral 253, and exit the circulator 239 at port 3, indicated by reference numeral 255, for delivery to downstream components, such as the downstream modulator 218, which is typically configured to pulse pick (and though not shown in FIG. 8 is typically controlled by the controller 272, at least so that the pulse picking is properly synchronized with pulses generated by the laser 230, also typically in communication with and/or under the control of the controller 272).

The CFBG 245 can provide a selected spectral dispersion of, for example, −100 ps/nm. As will be understood by one of ordinary skill in art considering the disclosure herein, the end to end orientation of a CFBG may matter in determining the spectral dispersion applied to the pulse (i.e., whether up chirp or down chirp is applied). Thus as the power level of the pulses, and hence the bandwidth of the pulses changes due to SPM, the time duration of the pulse reflected from the CFBG 245 will change, yielding a mechanism by which the time duration of the pulse can be tuned, as changing the gain of the amplifier 235 changes the peak power of the pulses.

For example, consider that the laser 230 generates substantially transform limited and un-chirped seed pulses having a time duration of 5 ps and a spectral bandwidth of, for example, about 0.25 nm. If the gain of the amplifier 235 is such that there is little or no SPM, the CFBG will increase the temporal width of the pulse by approximately 25 ps (100 ps/nm×0.25 nm=25 ps), to approximately 30 ps and after reflection from the CFBG 245 the 30 ps pulse will exit the circulator at port 3. (One of ordinary skill understands that the foregoing is an approximation that uses the FWHM spectral bandwidth and also assumes all linear chirp, which is not entirely accurate, as SPM adds non-linear chirp. The approximation is useful though and helps conceptual understanding, but modeling provides more accurate results, as demonstrated below). However, now consider increasing the gain of amplifier 235 such that it operates in the non linear regime and the seed pulse undergoes SPM, and that the SPM increases the bandwidth of the pulse from the laser 230 from 0.25 nm to 0.5 nm. Accordingly, the CFBG 245 will now reflect a pulse having a temporal pulse duration of approximately 55 ps (an increase of 100 ps/nm×0.5 nm=50 ps). Increasing the gain provides more SPM, an amplified pulse having a broader bandwidth, and hence a stretched pulse reflecting from the CFBG 245 having a further increased time duration. Providing a CFBG with a larger spectral dispersion (e.g., −200 ps/nm) can result in a larger tuning range, but also shifts the endpoints of the range and also the sensitivity of the change in temporal pulse width to a change in the peak power of the pulse, which in the embodiment shown in FIG. 8 corresponds to the sensitivity in response to a change in the gain of the amplifier 235. Accordingly the interplay between the initial temporal pulse width of the pulse provided by the laser 230, the amount that SPM can change the spectral bandwidth of the pulse, and the range over which it is desired to tune the pulse width of the pulses can be considered in designing a tunable temporal pulse width laser according to the teachings herein. Other techniques, such as the use of more than one spectrally dispersive element, as described in more detail below, can also be considered.

By way of example and not limitation, seed pulses from the laser 230, which can comprise the SESAM based PMLFL noted above, can have a spectral bandwidth of no greater than 5 nm, no greater than 3 nm, no greater than 2 nm, or no greater than 1 nm. In various practices of the invention, the pulses from the laser 230 have a temporal bandwidth no less than 1 ps and no greater than 100 ps, and can, in conjunction with the foregoing, have a spectral bandwidth of no greater than 2 nm, or, as may be more likely, no greater than 1 nm.

Figure 9:
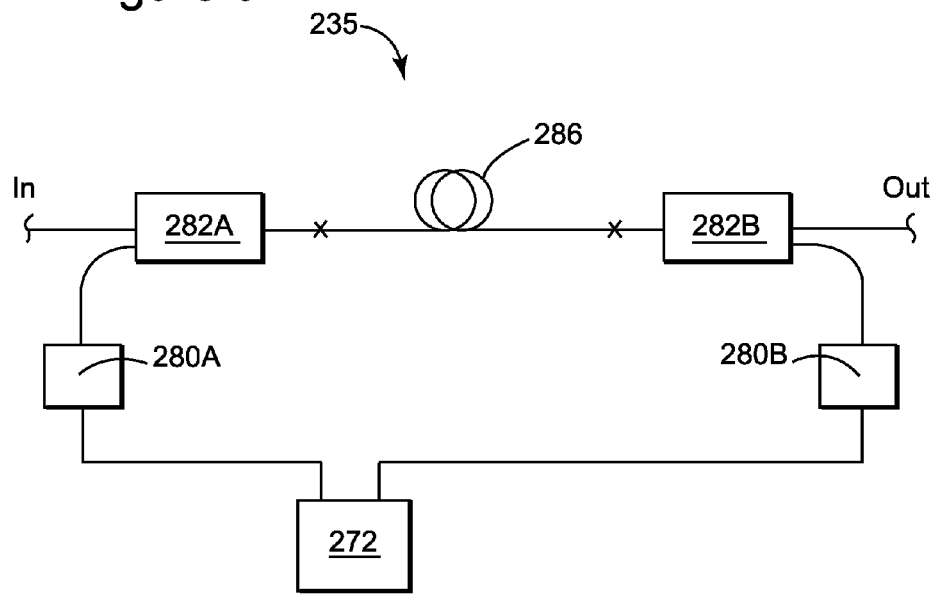
FIG. 9 schematically illustrates the architecture of an optical amplifier for providing self-phase modulation shown in the embodiment of the tunable temporal pulse width optical fiber laser shown in FIG. 8.

FIG. 9 schematically illustrates the architecture of an optical amplifier 235 that can operate in the non linear regime so as to provide an amount of SPM that varies with the gain of the amplifier. The amplifier 235 can include a pair of pump sources 280A and 280B, which can each comprise a fiber pigtailed laser diode that provides pump optical energy via optical couplers 282A and 282B, respectively, to the length of RED optical fiber 286. The controller 272 is also shown in FIG. 9, and can control gain of the amplifier 235 via control of the optical power emitted by the pump sources 280A and 280B, such as by controlling the current supplied to the laser diodes comprised by the pump sources 280A and 280B.

The pump sources 280A and 280B can each comprise a 200 mW 980 nm laser diode and the optical couplers 282A and 282B can each comprise a WDM optical fiber coupler that couples the 980 nm optical pumping energy to the core of the length of RED fiber 286 while providing low insertion loss to the optical energy being amplified by the length of RED fiber 286. The length of RED fiber 286 can include a Yb-doped core having a diameter of approximately 6 microns and a cladding having a diameter of approximately 125 microns. The core can have a numerical aperture (NA) of approximately 0.14. The core can include a concentration of Yb sufficient, for example, for providing of greater than 100 dB per meter at 915 nm. One suitable fiber is the YB 500 fiber available from specialty optical fiber manufacturer CorActive High-Tec Inc., having coordinates of 2700 Jean-Perrin, Suite 121, Quebec City, QC, Canada G2C 1S9.

Although the discussion of FIGS. 9 and 3 describe optically pumping a laser oscillator or an optical fiber amplifier using discrete optical couplers or, in the case of an oscillator, end pumping through a fiber Bragg grating, other techniques can be used. For example, it is also possible to pump a length of rare earth doped fiber of an oscillator or amplifier via an arrangement wherein a pump fiber runs adjacent to and coextensive with the rare earth doped fiber within a common jacket or coating. A fiber that includes both the rare earth doped fiber and the pump fiber can be drawn as a single continuous fiber structure from a draw tower.

As one of ordinary skill will understand from reading the present disclosure, the change in pulse width involves an interaction between the change in spectral bandwidth of the pulse, such as is due to the change in the SPM by varying the gain of the amplifier 235 of FIG. 8, and the spectral dispersion that then acts on that change in spectral bandwidth, such as is provided by the CFBG 245 of FIG. 8. Accordingly, there can often be more than one combination of an amount of change in spectral bandwidth and amount of spectral dispersion that will arrive at the same change in temporal pulse width.

Figure 10:
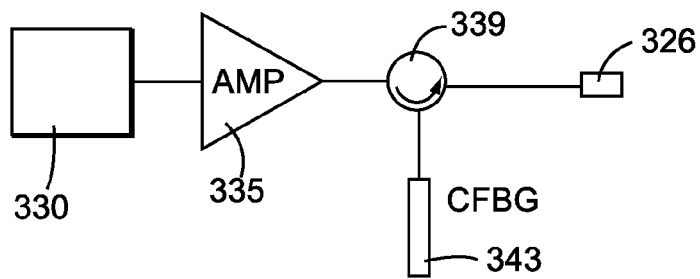
FIG. 10 schematically illustrates the architecture of a tunable temporal pulse width laser used for modeling to produce the temporal pulse power profile and pulse spectral profile shown in FIGS. 11-19.

FIG. 10 schematically illustrates the architecture of a tunable temporal pulse width laser used for modeling to produce the temporal pulse power profile and pulse spectra shown in FIGS. 11-19 below. The master source or seed laser 330 was taken as providing a substantially transform limited pulse having 5 ps pulse width and a $\mathrm{sech}^2$ shape at a 20 MHz pulse repetition frequency (PRF) and with 2 mW of average power to the nonlinear amplifier 335. Shown also are the circulator 339, which was assumed to be perfectly non-reciprocal and lossless for the purposes of modeling, and the CFBG 343. Modeling was performed for different values of spectral dispersion provided by the CFBG, starting with a dispersion of −10 ps/nm. The CFBG 343 was assumed, however, to have an infinite bandwidth. The amplifier was modeled as including a 2.5 meter length of single clad, Yb doped silica optical fiber YB-500 from CorActive noted above. The nonlinear propagation in an optical fiber amplifier is well described by the Nonlinear Schrodinger equation and can be solved numerically by a split-step Fourier method. The modeling procedure was programmed on a computer and followed the equations and numerical solution described in Chapter 2 of Nonlinear Fiber Optics by Govind P. Agrawal. For the gain in the fiber amplifier constant gain along the amplifier was assumed, which models a counter-pumping scheme.

Figure 11A:
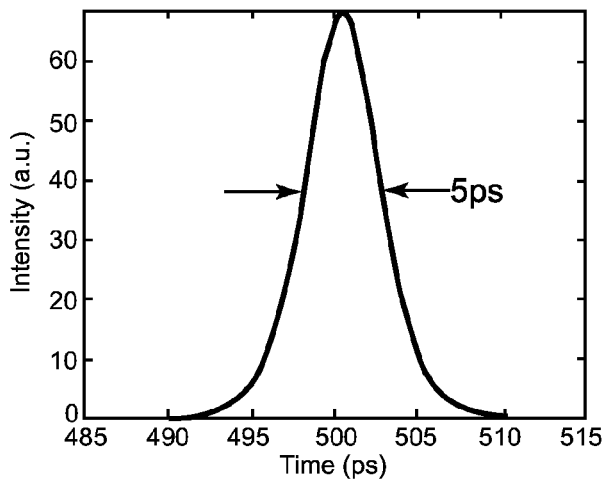
FIG. 11A schematically illustrates a the temporal power profile of a seed pulse provided by the tunable temporal pulse width laser of FIG. 10.
Figure 11B:
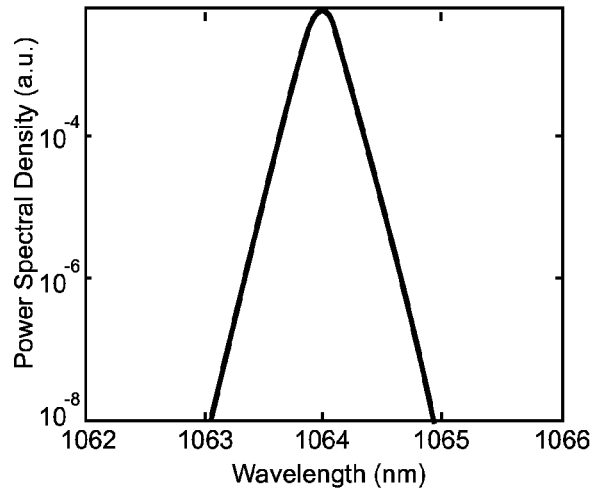
FIG. 11B schematically illustrates the pulse spectral profile corresponding to the temporal power profile of the seed pulse of FIG. 11A.
Figure 12A:
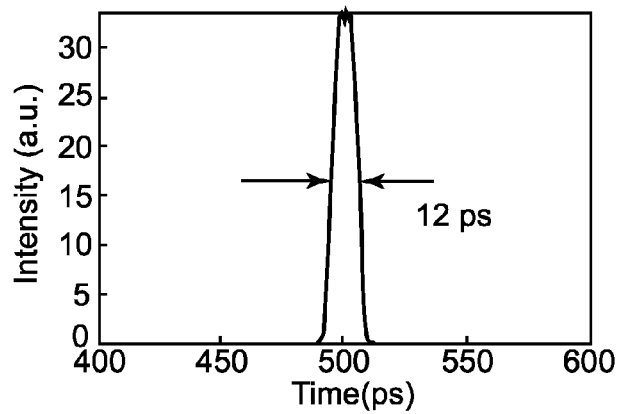
FIG. 12A schematically illustrates the temporal power profile of the seed pulse of FIG. 11A after being amplified by a first amount so as to have a first peak power and subsequently spectrally dispersed so as to have a first temporal pulse width.
Figure 12B:
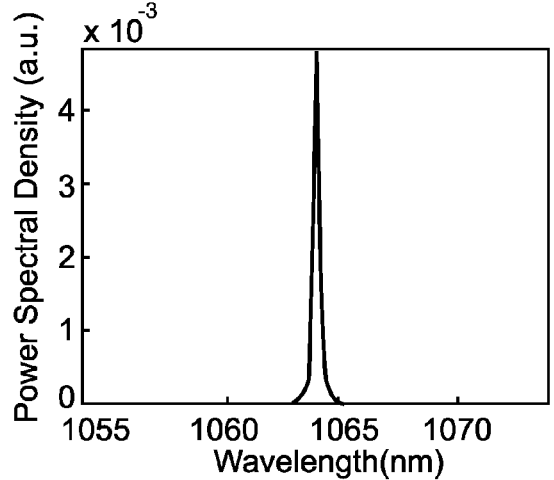
FIG. 12B schematically illustrates the pulse spectral profile corresponding to the temporal pulse power of the pulse of FIG. 12A.
Figure 13A:
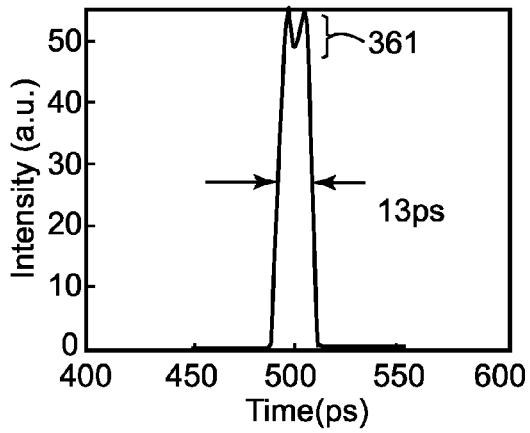
FIG. 13A schematically illustrates the temporal power profile of the seed pulse of FIG. 11A after being amplified by a second amount so as to have a second peak power and subsequently spectrally dispersed so as to have a second temporal pulse width.
Figure 13B:
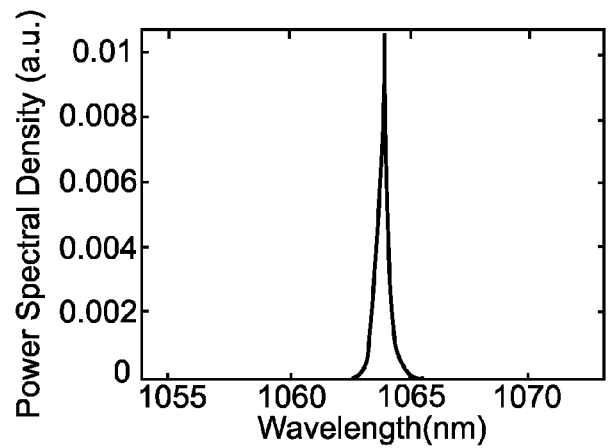
FIG. 13B schematically illustrates the pulse spectrum corresponding to the temporal pulse power of the pulse of FIG. 13A.
Figure 14A:
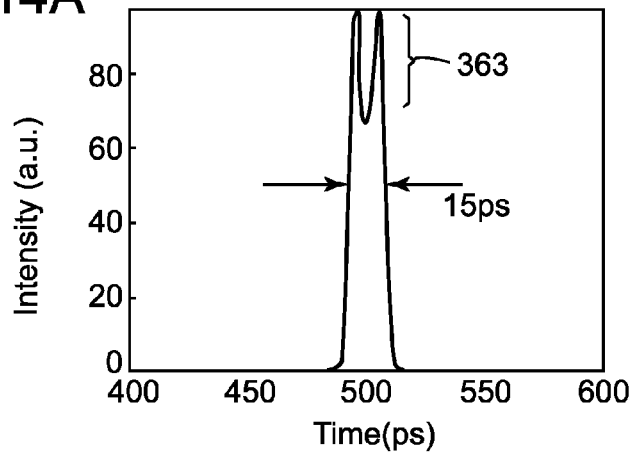
FIG. 14A schematically illustrates the temporal power profile of the seed pulse of FIG. 11A after being amplified by a third amount so as to have a third peak power and subsequently spectrally dispersed so as to have a third temporal pulse width.
Figure 14B:
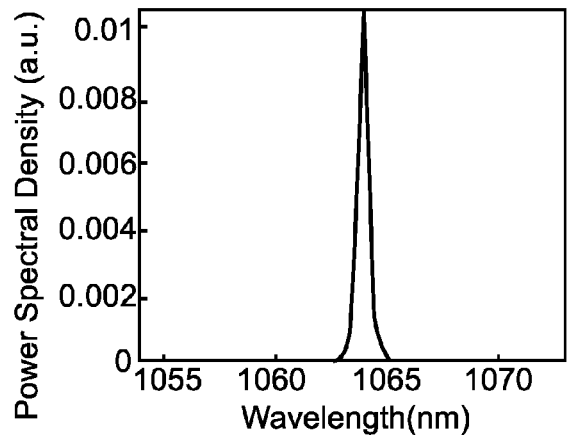
FIG. 14B schematically illustrates the pulse spectral profile corresponding to the temporal pulse profile of the pulse of FIG. 14A.

FIG. 11A schematically illustrates the temporal power profile of a seed pulse provided by the laser source 330 of FIG. 10. The seed pulse has a pulse width of approximately 5 ps and is transform limited, having or approximating a $\mathrm{sech}^2$ shape and a spectral bandwidth of about 0.25 nm. Spectral bandwidth, as that term in used herein, refers to the width of the spectral density plot according to a full width half maximum (FWHM) determination. FIG. 11B shows the spectrum of the seed pulse. Under 0 dB gain, the amplifier 335 will pass the pulses as shown in FIGS. 11A and 11B, which after reflection from the CFBG 343 will produce a pulse at the output 326 having a pulse duration of approximately 7.5 ps (5 ps+(10 ps/nm×0.25 nm))=5 ps+2.5 ps=7.5 ps. After amplification by 2.5 dB, which is a power level that includes SPM of the pulse, and reflection of the pulse from spectrally dispersive CFBG 343 of FIG. 10, the pulse has the temporal power profile and spectrum shown in FIGS. 12A and 12B, respectively. As shown in FIG. 12A, the pulse has a width of approximately 12 ps. Increasing the gain of the amplifier 335 to 5 dB produces the temporal power profile and spectrum shown in FIGS. 13A and 13B respectively, and further increasing the gain to 7 dB results in the temporal power profile and spectrum shown in FIGS. 14A and 14B. The pulse width increases with gain of the amplifier, from 12 ps in FIG. 12A, to 13 ps in FIG. 13A, and to 15 ps in FIG. 14A. Note that the spectra shown in FIGS. 12B, 13B and 14B are not significantly different, indicating that a relatively small amount of spectral broadening due to SPM can be sufficient to change the temporal pulse width after the subsequent spectral dispersion of the pulse by the CFBG. The spectra in the FIGURES typically have too low a resolution to show the link between bandwidth change due to SPM and change in pulse width due to the spectral dispersion of the CFBG. However the modeling data in the table below can be more informative in this regard.

| Gain (dB) | Bandwidth (nm) | Pulsewidth (ps) |
| --- | --- | --- |
| 0 | 0.24 | 10 |
| 2 | 0.26 | 12 |
| 5 | 0.30 | 13 |
| 7 | 0.80 | 15 |
| 10 | 1.13 | 17 |
| 13 | 1.80 | 21 |
| 15 | 2.76 | 30 |
| 18 | 4.34 | 47 |
| 20 | 6.83 | 72 |
| 23 | 10.80 | 112 |
| 25 | 17.10 | 175 |

Although not shown in the FIGURES, the temporal pulse width continues to increase with gain, and the modeling shows an increase to as much as 100 ps and above. The temporal pulse profiles of FIGS. 12A, 13A and 14A indicate increasing distortion of the pulse from the $\mathrm{sech}^2$ shape as the gain of the amplifier is increased. The slight center dip 361 shown in FIG. 13A (approximately 10% of the peak value of the temporal pulse profile) increases with gain, to the center dip 363 shown in FIG. 14A (to approximately 30%). As gain is further increased above the 7 dB of FIG. 14A the center dip in the temporal pulse profile continues to deepen and multiple dips can occur, with dips appearing in the spectrum of the pulse as well. Such temporal and spectral distortion can be more or less of a problem, depending on the application in which the tunable temporal pulse width laser is being used, and an appropriate criteria can be set, such as through a set of controlled experiments involving the application process of interest, to determine the amount of temporal or spectral pulse distortion that is acceptable in a given process. The criteria can be based, for example, on the percentage that the minimum of the dip (or deepest null of the dips if multiple dips are present) represents of the peak of the temporal power profile or of the spectrum (e.g., ≤10%, ≤25%, ≤40% etc). Other criteria may be appropriate in certain circumstances. For example, a criterion could be based on the depth or number of dips in the spectral profile of the pulse (often otherwise referred to herein as the spectrum of the pulse).

Figure 15A:
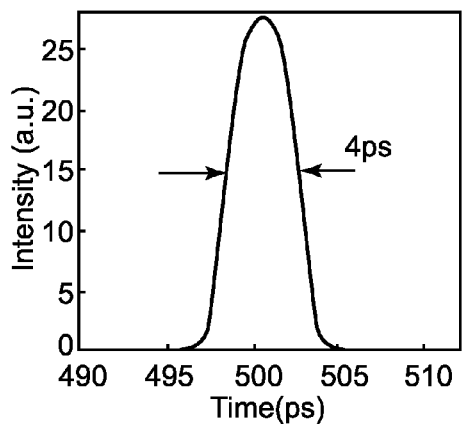
FIG. 15A schematically illustrates the temporal power profile of a parabolic seed pulse provided by a laser source of the tunable temporal pulse width laser of FIG. 10.
Figure 15B:
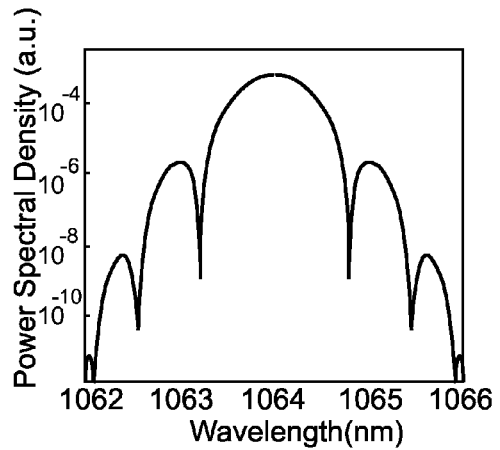
FIG. 15B schematically illustrates the pulse spectral profile corresponding to the temporal power profile of the parabolic seed pulse of FIG. 15A.
Figure 18A:
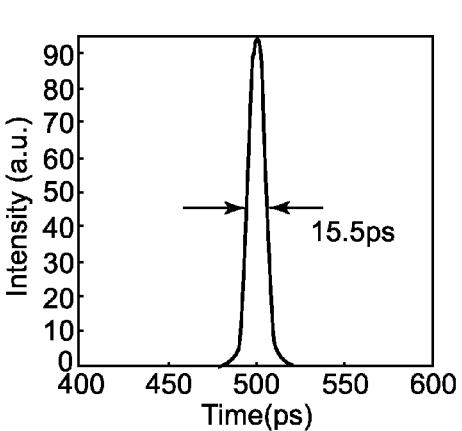
FIG. 18A schematically illustrates the temporal power profile of the parabolic seed pulse of FIG. 15A after being amplified by a third amount so as to have a third peak power and subsequently spectrally dispersed so as to have a third temporal pulse width.
Figure 18B:
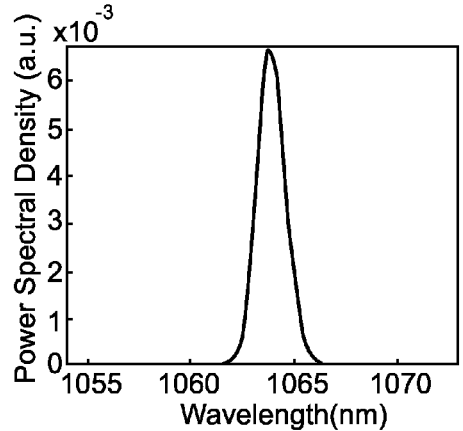
FIG. 18B schematically illustrates the pulse spectral profile corresponding to the temporal pulse profile of the pulse of FIG. 18A.
Figure 19A:
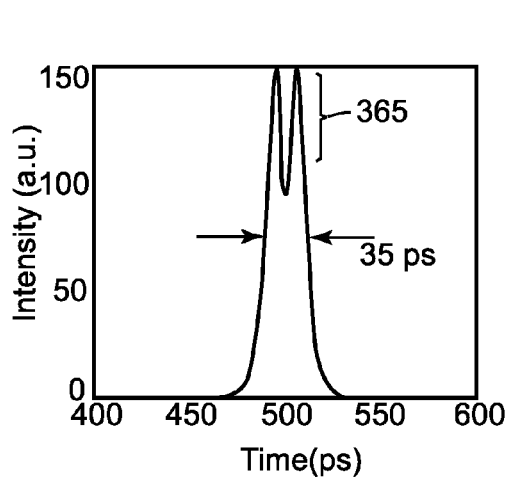
FIG. 19A schematically illustrates the temporal power profile of the parabolic seed pulse of FIG. 15A after being amplified by a fourth amount so as to have a fourth peak power and subsequently spectrally dispersed so as to have a fourth temporal pulse width.
Figure 19B:
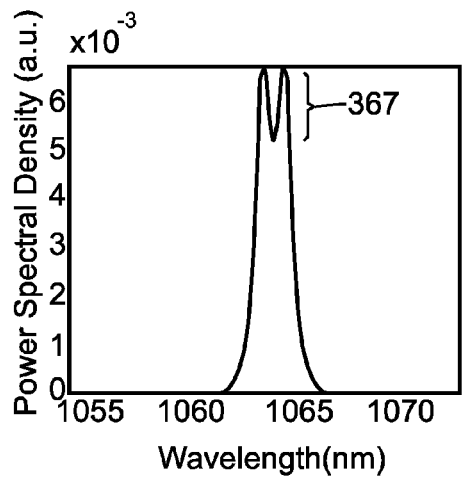
FIG. 19B schematically illustrates the pulse spectral profile corresponding to the temporal pulse profile of the pulse of FIG. 19A.

Applicants have found that the characteristics of the seed pulse can affect the degree to which distortion occurs in the amplified and spectrally dispersed pulse. For example, considers FIGS. 15 to 19. FIGS. 15A and 15B, respectively, show the temporal pulse profile and spectrum of a parabolic seed pulse have a 4 ps pulse width. Parabolic pulses can be generated using various techniques. For example, a parabolic pulse can be generated from a Gaussian or $\mathrm{sech}^2$ pulse produced by the PMLFL using a fiber grating with a parabolic reflection profile. The fiber grating can also have a bandwidth that is smaller than the bandwidth of the Gaussian or sech$^2$ pulse. The spectrum in FIG. 15B is somewhat idealized, as one of ordinary skill can ascertain. FIGS. 16A, 17A, 18A and 19A show the temporal power profiles of the pulse under respectively, 2.5 dB, 7.5 dB, 12.5 dB and 17.5 dB of amplification. With reference to FIGS. 16A, 17A, 18A and 19A, 2.5 dB of gain yields a pulse width of 5.6 ps; 7.5 dB of gain yields a pulse width of 6.5 ps; 12.5 dB of gain yields a pulse width of 15.5 ps; and 17.5 dB of gain yields a pulse width of 35 ps. As shown in FIG. 18A, an amplification factor of 12.5 dB increases the pulse width from 4 to 15 ps with no serious pulse distortion. FIG. 19A indicates the appearance under amplification of 17.5 dB of the dip 365, where the dip 365 is approximately 30% of the peak of the temporal pulse profile. FIGS. 16B, 17B, 18B and 19B show the spectral power profiles of the pulses under the aforementioned gain factors of 2.5 dB, 7.5 dB, 12.5 dB and 17.5 dB, respectively. FIG. 19B shows that a center dip in the spectral profile, indicated by reference numeral 367, accompanies the appearance of the center dip 365 in the temporal power profile under 17.5 dB of amplification. Although not shown in detail herein, as with the sech$^2$ seed pulses, the dips in the temporal and spectral profiles can become deeper and more numerous as the gain of the amplifier 335, and hence the peak power or optical intensity of the pulses is increased.

Figure 16A:
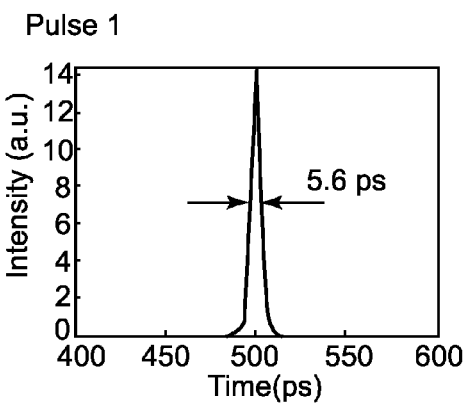
FIG. 16A schematically illustrates the temporal power profile of the parabolic seed pulse of FIG. 15A after being amplified by a first amount so as to have a first peak power and subsequently spectrally dispersed so as to have a first temporal pulse width.
Figure 16B:
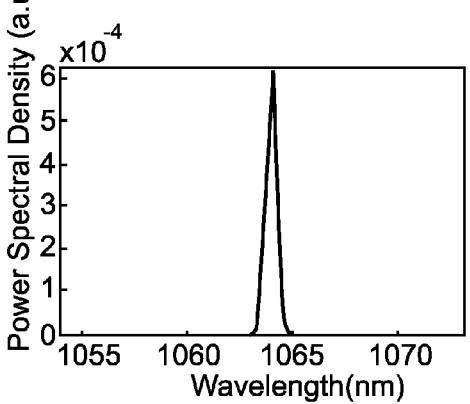
FIG. 16B schematically illustrates the pulse spectral profile corresponding to the temporal pulse profile of the pulse of FIG. 16A.
Figure 17A:
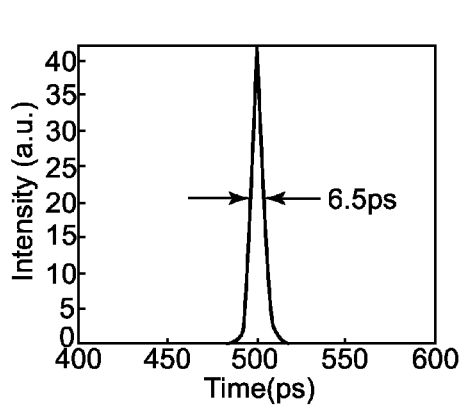
FIG. 17A schematically illustrates the temporal power profile of the parabolic seed pulse of FIG. 15A after being amplified by a second amount so as to have a second peak power and subsequently spectrally dispersed so as to have a second temporal pulse width.
Figure 17B:
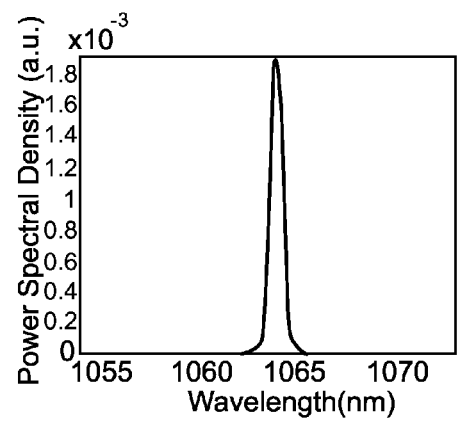
FIG. 17B schematically illustrates the pulse spectrum corresponding to the temporal pulse profile of the pulse of FIG. 17A.

Thus use of the parabolic seed pulse appears to allow more variation in the pulse width before the appearance of pulse distortion than the use of the sech$^2$ seed pulse. For example, the modeling does not show a dip appearing in the temporal power profile until the pulse width is increased to about 35 ps (FIG. 19A) from an initial value of less than 5.6 ps (FIG. 16A, showing 5.6 ps, is for a gain of 2.5 dB), and although the discrete nature of the gain steps used in the modeling could mean the dip in the temporal power profile occurs at a pulse width of less than 35 ps, this is a larger range than the range from 7.5 ps (FIG. 12A) to the 15 ps pulse width showing a pronounced dip (FIG. 14A) for the sech$^2$ seed pulse. Of course the tuning range for the sech$^2$ pulse could be significantly expanded by using a larger amount of spectral dispersion than the −10 ps provided by the CFBG 343.

Figure 20:
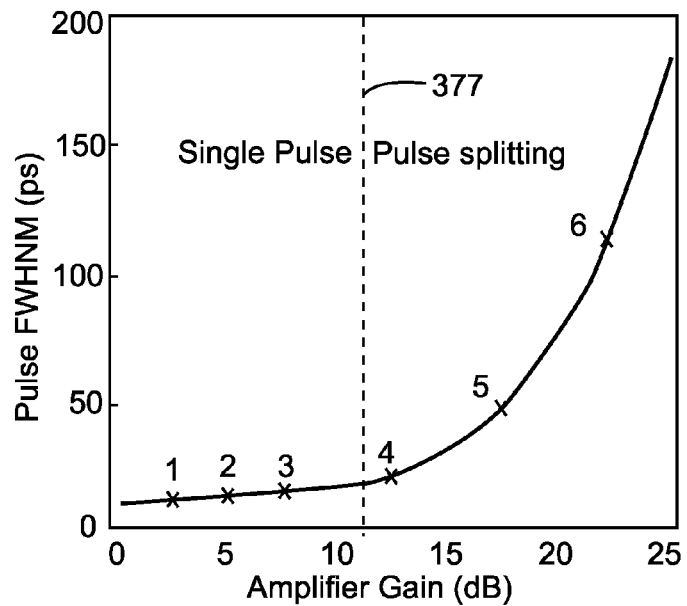
FIG. 20 is plot of temporal pulse width versus amplifier gain for the amplification and subsequent spectral dispersion of the seed pulse having the temporal power profile and spectral profile shown in FIGS. 11A and 11B, respectively.
Figure 21:
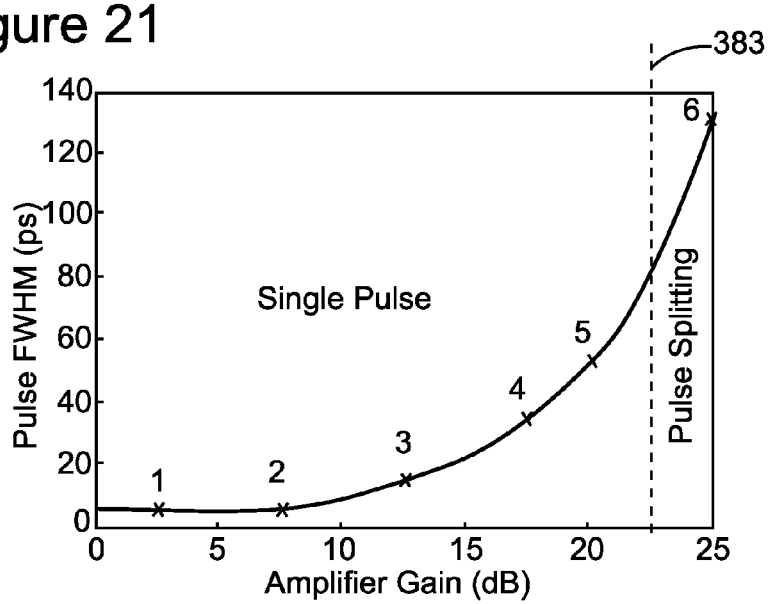
FIG. 21 is a plot of temporal pulse width versus amplifier gain for the amplification and subsequent spectral dispersion of the parabolic seed pulse having the temporal power profile and spectral profile shown in FIGS. 15A and 15B, respectively.

FIG. 20 is a plot of temporal pulse width versus amplifier gain for the sech$^2$ seed pulse of FIGS. 11A and 11B and FIG. 21 is a similar plot for the parabolic seed pulse shown in FIGS. 15A and 15B. For each plot a criterion for acceptable pulse distortion is indicated (see dotted line 377 in FIG. 20 and dotted line 383 in FIG. 21). As noted herein, the criterion of acceptable pulse distortion can vary according to many variables, such the type of laser, application that the laser is to be used for, etc. Assuming the criterion indicated by 377 is determined according to an analysis similar to that used for criterion indicated by reference numeral 383, FIGS. 20 and 21 show that the parabolic seed pulses can allow a wider range of tunable temporal pulse widths.

The tuning range of a tunable temporal pulse width laser, such as, for example, the tunable temporal pulse width laser of FIG. 10, can be expanded by making provision for the laser to incorporate, and be able to select between, a plurality of spectrally dispersive elements providing different amounts of spectral dispersion. Consider FIG. 22, which plots modeled temporal pulse width versus amplifier gain (given in steps of 0 to 6) for five CFBGs having different spectral dispersions. More particularly, curves 403, 405, 407, 409 and 411 represent temporal pulse duration as a function of amplifier gain for spectral dispersions of, respectively, −10 ps/nm, −20 ps/nm, −50 ps/nm, −100 ps/nm and −200 ps/nm. For example, curve 407, corresponding to a spectrally dispersive element having a spectral dispersion of −50 ps/nm, indicates that the temporal pulse width can be tuned as a function of amplifier gain from about 20 ps at zero gain to about 40 ps at a gain of 5.

Proper selection of the spectral dispersion of each of the selectable dispersive elements can expand the range over which the temporal pulse duration may be tuned while maintaining pulse distortion within certain limits, as can be explained in more detail with reference to FIG. 22. For example, consider that an amplifier gain of 5, indicated by the vertical line 421, but no greater, is one criterion for acceptable pulse distortion. Below a gain of 5, pulse distortion is acceptable, whereas above, it is not. (Pulse distortion can mean distortion in the temporal or spectral domain.) Thus the maximum temporal pulse width provided for a first curve will be that provided at an amplifier gain of 5. Accordingly, that first curve maximum temporal pulse width should be no greater than the value of a temporal pulse width provided by another curve at a gain of less than 5. Preferably the another curve provides this value at, for example, an amplifier gain of zero. This allows the fewest dispersive elements to be used over a particular continuous tuning range of temporal pulse durations.

Figure 22:
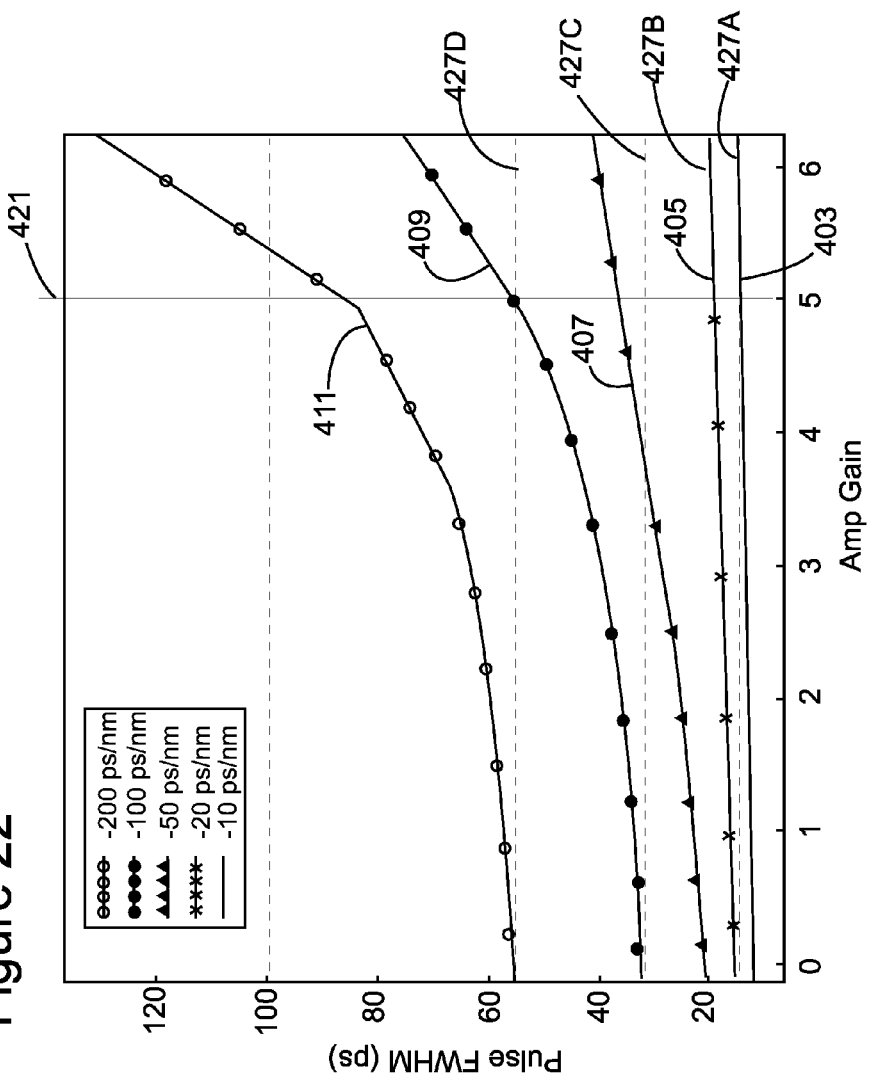
FIG. 22 plots temporal pulse width verses amplifier gain for the seed pulses of FIGS. 11A and 12B, where each curve corresponds to subjecting the amplified pulse to a different amount spectral dispersion.

Horizontal lines 427A, 427B, 427C and 427D of FIG. 22 aid explanation of this concept. Curve 403, representing a spectral dispersion of −10 ps, shows that the pulse width can be tuned from approximately 5 ps to approximately 15 ps, with the 15 ps pulse width being provided at an amplifier gain of 5. Tracing line 427A back from right to left, it can be seen that curve 405, representing a dispersive element having a spectral dispersion of −20 ps/nm, can provide a pulse width of approximately 15 ps as well, but at a gain of 0, and increasing the gain to 5 along curve 405 increases the pulse width to about 20 ps. Now tracing line 427B to the left, 20 ps is approximately the temporal pulse width provide at curve 407, representing a spectral dispersion of −50 ps/nm, for a gain of zero. Increasing the amplifier gain along curve 407 similarly increases the temporal pulse width further.

As can be seen from FIG. 22 and the curves 403, 405, 407, 409 and 411, the proper selection of dispersive elements, in this case dispersive elements having dispersions of −10 ps/nm, −20 ps/nm, −50 ps/nm, −100 ps/nm and −200 ps/nm, can allow more or less continuous tuning of the temporal pulse width, with the pulses with a selected criterion regarding pulse distortion, over a range from 5 above 80 ps.

Figure 23:
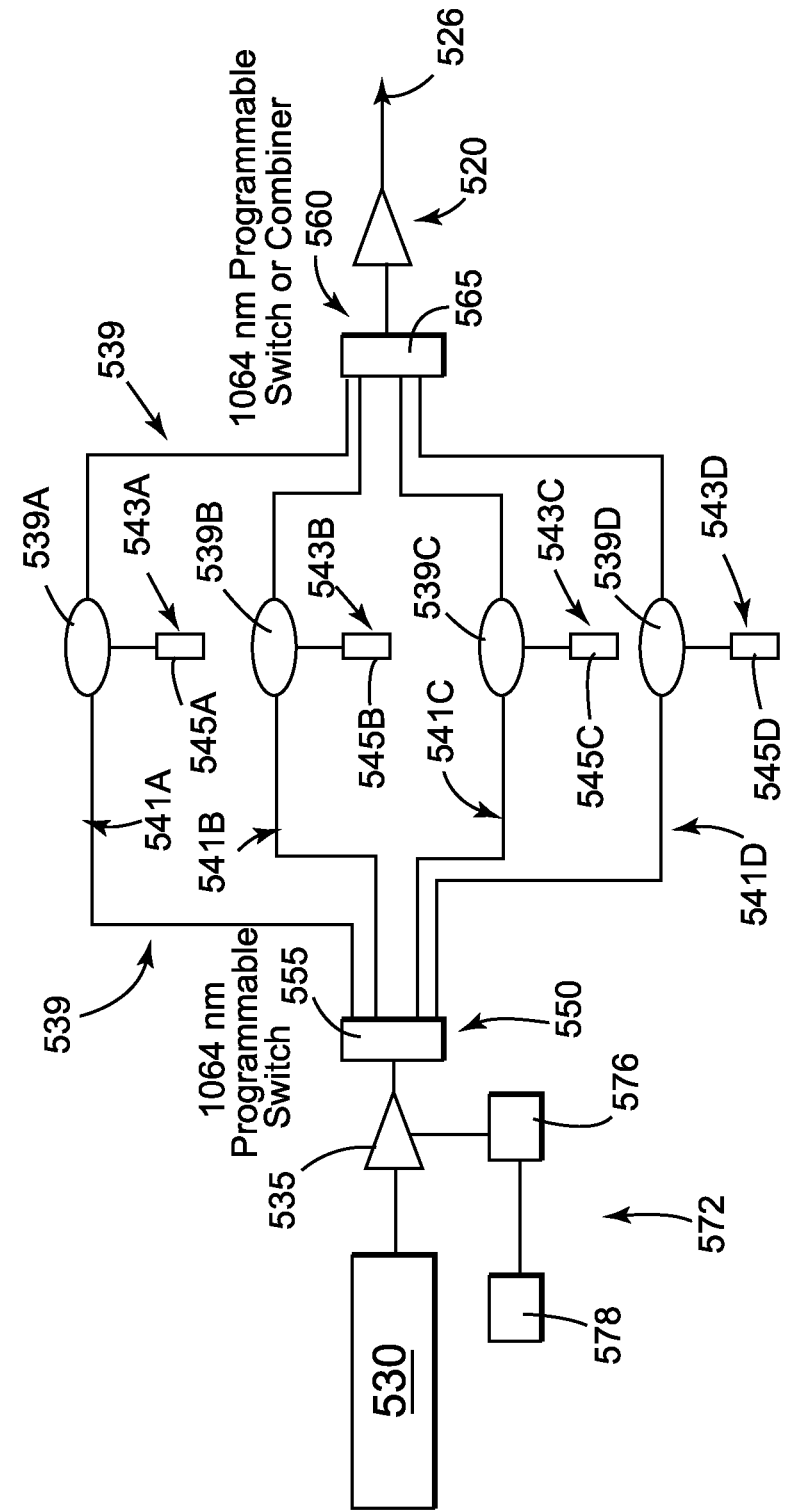
FIG. 23 schematically illustrates the architecture of another embodiment of a tunable temporal pulse width laser according to the present disclosure.

FIG. 23 schematically illustrates one possible embodiment of a tunable temporal pulse width laser that incorporates a plurality of spectrally dispersive elements having different spectral dispersions. The tunable temporal pulse width laser 512 can include a master oscillator or seed laser 530 and an amplifier 535 for providing SPM as a function of gain, as well as a plurality of selectable optical paths 541, where each of the paths 541A, 541B, 541C and 541D can provide a different amount of spectral dispersion for providing a plurality of bands over which the temporal pulse width of the tunable temporal pulse width laser 512 can be tuned as the gain of the amplifier 535 is varied. The bands can be continuous or discontinuous, or a combination thereof. The different optical paths can each include a circulator and a dispersive optical element. For example, spectrally dispersive optical path 541A can include circulator 539A and dispersive element 543A, which can comprise CFBG 545A providing a spectral dispersion of −10 ps/nm; spectrally dispersive optical path 541B can include circulator 539B and dispersive element 543B, which can comprise CFBG 545B providing a spectral dispersion of −20 ps/nm; spectrally dispersive optical path 541C can include circulator 539C and dispersive element 543C, which can comprise a CFBG 545C providing a spectral dispersion of −50 ps/nm; and spectrally dispersive optical path 541D can include circulator 539D and dispersive element 543D, which can comprise a CFBG 545D providing a spectral dispersion of −100 ps/nm.

The tunable temporal pulse width laser 512 can include the splitter 550, which can comprise the 1×4 optical switch 555, and the combiner 560, which can comprise 1×4 optical switch 565. The optical switches 555 and 565 can be programmable such that a selected one of the optical paths 539 can be chosen. The tunable temporal pulse width laser 512 can further include a power amplifier or amplifier cascade, represented by reference numeral 520, upstream of the output 526 and downstream of the spectrally dispersive elements 543A, 543B, 543C and 543D, as well as a pulse picker (not shown in FIG. 23). The controller 572 can control the switches 555 and 565 as well as the amplifier 535 and amplifier or amplifier cascade 520, though for simplicity a relationship therebetween is not explicitly shown in FIG. 23. The provision of the plurality of optical paths 541 can allow the tunable pulse width laser 512 to provide a wider range of tunability of the pulse time duration of the output pulse than if the pulsed laser system comprised only one of the plurality of spectrally dispersive optical paths 541.

Note that in another practice of the disclosure, the spectral bandwidth of the pulses is not necessarily varied, such as by varying the amount of SPM introduced to a pulse, and the tunable temporal pulse width laser 512 allows for selection from a finite number of relatively fixed temporal pulse widths (four in the case of the embodiment shown in FIG. 23) via selection of the appropriate one of the optical paths 541, each of which temporally stretches the pulse to a different temporal pulse width due to the different spectrally dispersive properties of the four CFBGs 545A, 545B, 545C, and 545D. In this practice the amplifier 535 may be eliminated under certain circumstances, or if present have fixed gain. Thus the architecture show in FIG. 23 can also be employed to produce finite number of fixed temporal pulse widths, such as in certain practices of the disclosure involving the optical laser architectures schematically shown in, for example, FIGS. 2, 5 and 6.

One of ordinary skill in the art will recognize, based on the disclosure herein, that in many instances structures alternative to those shown in the appended FIGURES can be used to achieve the benefits of the inventions disclosed herein. For example, regarding the embodiment shown in FIG. 8, the circulator 239 can be replaced with a simple polarization beam splitter and appropriate waveplates and Faraday rotators to transfer the beam from port 1 (reference numeral 251) via port 2 (reference numeral 253) to port 3 (reference numeral 255). Such implementations are well known in the state-of-the-art and will not be shown here. As yet another example of an alternative, a microstructured fiber can be incorporated as a spectrally dispersive element 243. In conjunction with such a dispersive element, circulators may not be required. Rather, in certain practices of the invention the dispersive element may be inserted directly between ports 251 and 255 without the need of any non-reciprocal optical elements. A dispersive element, as that term is used herein, can also include a grating pair wherein the spectral dispersion is effected, by spatial dispersion of different wavelengths along different optical paths such that different wavelengths travel different path lengths, and hence experience different time delays. By way of further example, and not limitation, within the ambit of dispersive optical element are a prism, optical fiber, dispersive delay line, transmission gratings, diffractive elements, reflection gratings, arrayed waveguide gratings, and combinations of the foregoing, including for a example, a pair of diffraction gratings. One of ordinary skill in the art will recognize that other examples of dispersive elements, in light of the teachings herein.

Also, a tunable temporal pulse width laser can also be realized by providing a spectrally dispersive element 243 wherein the amount of spectral dispersion can be changed. For example, tuning the spectral dispersion from an (absolute) value of 10 ps/nm to, for example, 10.5 ps/nm will change the pulse width of a pulse having a 2 nm spectral bandwidth from 20 ps (10 ps/nm×2 nm=20 ps) to 21 ps (10.5 ps/nm×2 nm=21 ps). Tuning the spectral dispersion of the spectrally dispersive element can be used in conjunction with or as an alternative to varying the optical intensity of the pulses, such as by changing the gain of the amplifier 235, to vary the amount of SPM that acts on the pulses. For example, it is known that subjecting a fiber Bragg grating to selected compressive or tensile strain tunes the grating, and that compression is favored over tension, at least for the reason that tension tends to cause stress fractures in an optical fiber to propagate, leading to a potential earlier failure of the fiber. A CFBG could be made tunable by compressing all or part of the grating, or selectively compressing different sections of the grating or differently, via the use of, for example, piezoelectric or other actuators suitably coupled to an appropriately fixtured grating. Fixturing a fiber Bragg grating for compressive tuning is known, as is tuning such a grating via variation of the temperature of the grating. "Spectrally dispersive element" can refer to optically spaced dispersive elements, such as, for example concatenated CFBGs, one or more of which could be selectively tunable.

As noted above, the amount of SPM, and hence change in spectral bandwidth, is related to the peak power or optical intensity of pulses propagating in a medium that supports SPM. In a practice of the disclosure described above, the amount of SPM is modified by varying the gain of the amplifier 235, such as by varying the pump power supplied to the active optical fiber of amplifier, where the active fiber is designed to generate SPM. However, other approaches to varying the SPM are possible. For example, with reference to FIG. 8, a variable optical attenuator (VOA) can optionally be interposed upstream of the amplifier 235, such as, for example, between the laser 230 and the amplifier 235 (as indicated by reference numeral 290A in FIG. 8). The VOA can be controlled by the controller 272 for varying the strength of the signal provided to the amplifier 235, and hence peak power or optical intensity of the pulses propagated by, for example, the length of active fiber 286 (see FIG. 9) of the amplifier 235, and hence the amount of SPM. The amplifier 235 in this instance could provide relatively fixed gain. In another approach, in some instances the master oscillator laser 230 could be designed such that the SPM occurs within the laser, and varying the output power of the laser, such as by varying the pump power supplied to the active medium of the laser, varies the SPM generated in the active medium of the master oscillator laser 230 (e.g., with reference to FIG. 3, within the length of RED optical fiber 86). The amplifier 235 in this instance may not be needed, or could, as noted above, provide relatively fixed gain with or without the generation of additional SPM.

The SPM need not occur in an active medium, however. A tunable temporal pulse width laser according to the teachings herein can include a length of passive optical fiber, for example, that provides the SPM. Several configurations are possible, and some are now described. A length of passive fiber, indicated by reference numeral 293 in FIG. 8, can be substituted for the amplifier 235 in FIG. 8 and the peak power or optical intensity of pulses propagated by the passive fiber then varied to vary the SPM occurring in the length of passive fiber. The passive fiber could have the design parameters noted above for the active fiber of the amplifier 235, typically absent the inclusion of the active material. The SPM in the length of passive fiber could be controlled by varying the output power of the laser 230 or by interposing a VOA 290A between the laser 230 and the length of passive fiber 293 and varying the attenuation provided by the VOA 290A. In another approach, the amplifier 235 can comprise a high power linear amplifier that substantially avoids SPM and the length of passive fiber 293 located downstream of the amplifier 235, with the gain of the amplifier 235 varied or a VOA interposed between the amplifier 235 and the length of passive fiber for controlling the power level in the length of passive fiber and hence the SPM. For example, with continuing reference to FIG. 8, the length of passive fiber 293 can be interposed between the optional VOA 290B and the circulator 239. The foregoing approaches, of course, are not mutually exclusive, and can be used in various combinations. Furthermore, although the foregoing discussions includes considerable mention of fiber-based devices, the invention is not limited to involving only fiber-based components, or to using fiber-based components at all. Other waveguide structures, as well as free space transmission and the use of bulk optical components, are within the purview of the invention.

Furthermore, although the discussion above regarding FIG. 8 indicates that the SPM increases the spectral bandwidth of the pulse, in certain practices a tunable laser can be realized where SPM reduces the spectral bandwidth of the pulse received from the seed laser 230. In such a practice of the invention increasing the SPM, such as by increasing the gain of the amplifier 235 and hence the peak power of the pulses, results in a reduction in pulse spectral bandwidth and hence a shorter pulse after reflection from the CFBG 245. For example, if the laser 230 provides pulses having a negative chirp, the positive chirp provided by SPM will tend to cancel the negative chirp, resulting in a pulse having a reduced spectral bandwidth.

The present disclosure teaches a laser having a tunable temporal pulse width and FIG. 24A is a chart schematically showing steps that can be involved in one method for providing different temporal pulse width pulses from the same laser. Turning now to FIG. 24A in detail, as indicated by reference numeral 601A, it is learned that laser output pulses having a selected temporal pulse width are desired. Accordingly, as indicated by reference numeral 605A, a laser is provided that outputs pulses having the selected temporal pulse width. These pulses having the selected temporal pulse width are provided by the laser at least in part because of a process of spectral dispersion that introduces a change in temporal pulse width responsive to an amount of spectral bandwidth modification of seed pulses. As indicted by reference numeral 607A, it is learned that output pulses having a desired temporal pulse width that is different than the selected temporal pulse width are desired. Accordingly, as indicted by reference numeral 609A, the temporal pulse width is changed to have the desired temporal pulse width by adjusting at least one of the amount of spectral bandwidth modification or the amount of spectral dispersion so as to provide a different amount of temporal pulse width change than that used to generate the pulses having the selected temporal pulse width, thereby changing the temporal pulse width of the output pulses.

Although much of the discussion above has involved tunable temporal pulse width lasers, the teachings herein are also useful in relation to a simplified method of providing a plurality of lasers that are different in some ways but that share other commonalities. For example, consider that a customer requires a number of lasers having different temporal pulse widths, where perhaps the customer has several different processing stations performing different processes, and where the temporal pulse width has been optimized for each process. The customer does not in fact need the lasers at each of the processing stations to be tunable, and may in view of reducing the opportunity for operator error wish to avoid giving an operator the option of tuning the output temporal pulse width of the laser.

Adjustment of one or both of the amount of spectral bandwidth modification of a pulse and the amount of the spectral dispersion that acts on the spectral bandwidth modification can be used to modify lasers of otherwise similar design so as to have different temporal pulse widths. More particularly, with reference to FIG. 8, the lasers could have different temporal pulse widths produced at least in part by adjusting the spectral band width change in a portion of the laser, such as by adjusting the gain in amplifier 235, that works in conjunction with subsequent spectral dispersion, such as can be provided by the dispersive element 243, to change the temporal pulse width of the output of the laser.

The spectrally dispersive element, such as CFBG 245, could be tunable, and can be adjusted to change the temporal pulse width. Note that it is not unreasonable to allow for more difficulty in adjustment of the spectral dispersion in a manufacturing environment, where repeated adjustment is not expected. It could also be possible to simply change to a dispersive element having a different spectral dispersion, such as a CFBG having a different value of spectral dispersion, in conjunction with or as an alternative to adjusting the spectral bandwidth of the pulse, such as via adjusting the gain of the amplifier 235 to adjust SPM. This may allow the gain of the amplifier 235 to be used for "fine" adjustment of temporal pulse width, with the "coarse" adjustment being made via a tunable CFBG or by simply switching the CFBG to one that provides a temporal pulse width in the range of the desired temporal pulse width.

The lasers could share some features that are substantially the same, such as the general design of the master oscillator (e.g., a PMLFL) and the use of spectral bandwidth modification (e.g., via SPM) and spectral dispersion (e.g., via a CFBG stretcher) to determine the time duration of the output pulse. For example, the seed lasers could all be PMLFLs having cavities with a SESAM mode locking element, length of active fiber having normal dispersion at the operating wavelength and where the laser cavity includes a dispersive element for adjusting the overall cavity dispersion so as to produce soliton or soliton like pulses. The lasers could functionally differ in ways in addition to producing different temporal pulse width while still sharing significant features in common. For example, perhaps optimization of the processes at the different processing stations requires that some lasers operate at different PRFs. The PRF of the mode locked seed laser can be changed by varying the length of the active optical fiber used in the laser cavity of the mode locked laser, which is not a particularly difficult manufacturing variation to accommodate.

In such a case, it is considered that changing the temporal pulse widths of the lasers according to the teachings herein, such as by varying that gain of the amplifier 235 of FIG. 8 so as to provide a different amount of SPM, still allows simplification of the manufacture of lasers having different temporal pulse widths. For example, a more conventional approach to varying the temporal pulse width is to have the mode locked laser cavities of the different lasers include different spectrally dispersive elements so as to provide different overall cavity dispersions for the mode locked seed lasers. If, for example, the spectrally dispersive element of the laser cavity comprises a fixed grating, a number of different gratings can be required as well as trial and error procedure to find just the right grating that produces the proper temporal pulse width. A tuning procedure where gain is simply varied as temporal pulse width measured and then locked in once the proper temporal pulse width is found, even if used as fine tuning procedure to tune in different CFBGs 245, can be simpler and more attractive than splicing in and out of a laser cavity a number of test gratings having different spectral dispersion characteristics, and then in manufacturing requiring that a number of different fixed gratings be added to the bill of materials and documents in the assembly procedures for the lasers.

Other features of the lasers could also be different, or be the same in the different lasers, such as, for example, the operating wavelength (e.g., about 1 μm, or more particularly, 1064 nm), average power, pulse energy, etc. Not only could the lasers be of the same general design (e.g., have the optical architecture shown in FIG. 8), virtually all components could in fact be substantially identical in construction.

FIG. 24B is chart schematically illustrating steps that can be followed in one practice of the present disclosure for providing a plurality of lasers wherein each laser provides output pulses having a temporal pulse width that is different than the temporal pulse width of the output pulses provided by the other lasers. As indicated by reference numeral 601B, it is learned that a first laser that can output pulses having a first temporal pulse width is desired. Accordingly, as indicated by reference numeral 605B, the first laser is procured (e.g. fabricated or otherwise obtained), where the first laser outputs pulses having a selected temporal pulse width at least in part because of a process of spectral dispersion that changes the temporal pulse width responsive to an amount of spectral bandwidth, as is taught herein. As indicated by reference numeral 607B, it is desired to procure another laser having output pulses having a desired temporal pulse width that is different than the selected temporal pulse width. As indicated by reference numeral 609B, the other laser is fabricated, where the other laser outputs pulses having the desired temporal pulse width also at least in part because of a process of spectral dispersion that changes the temporal pulse width responsive to an amount of spectral bandwidth. However, the procurement of other laser includes changing at least one of the amount spectral bandwidth and the amount of spectral dispersion to be different from that of the first laser so as to provide a different amount of temporal pulse width change than that provided in the first laser.

As noted above, it is considered that the foregoing approaches for providing a plurality of lasers having different relatively fixed temporal pulse widths, or that are tunable over different temporal pulse width bands, can be particularly useful when, with reference to FIG. 8 as one example, the initial laser 230 comprises a passively mode lock-fiber laser, where the mode locking element comprises a SESAM, and the active optical fiber comprises normal dispersion (positive GVD) at the operating wavelength of the laser (e.g., the length of active fiber comprises a Yb doped fiber and the operating wavelength is about 1 μm). The seed laser can comprise a spectrally dispersive element to provide the proper overall cavity dispersion. The seed laser, as well as the overall laser shown in FIG. 8, can provide, for example, ultrafast, ultrashort, or fast pulses.

It is considered that the teachings of the disclosure can thus allow more efficient or effective discovery or optimization of process parameter windows for materials by providing a wider range of pulse widths to be obtained from a smaller range of lasers or laser types. However pulse width is but one of the many processing parameters noted above. Pulse energy, for example, can also be important. One of ordinary skill in the art, in light of the teachings herein, will understand how to use techniques taught herein to make and use tunable pulse energy lasers. For example, controlling pumping optical energy of an amplifier or laser can control pulse energy. However, in certain embodiments of the disclosure, such as an all fiber implementation of a tunable pulse width laser, non linear phenomena such as stimulated Raman scattering (SRS) can limit increasing pulse energy for pulses having too short a pulse width or introduce other deleterious effects. Returning briefly to FIG. 1, consider that the power amplifier 24 comprises a fiber amplifier. Because optical fiber spatially confines optical energy to a greater degree than, for example, a bulk rod-type active optical resonator material, SRS can impose a limit on available pulse energies above a certain threshold. The threshold can be expressed in terms of optical intensity or more conveniently in some cases where pulses are concerned, in term of the peak power (PP) pulse. For example, one PP threshold for SRS in an optical fiber amplifier can be about 150 kW. Because PP is proportional to pulse energy divided by temporal pulse width, for a given temporal pulse width the SRS PP threshold will be reached when the pulse energy is increased to a certain value.

However, in many processes pulse energy can be an as important, or a more important, processing parameter than pulse width, and certain materials can have a threshold pulse energy required for effective or optimal processing. Discovering the pulse energy threshold and/or process window can involve experimental processing studies over a range of pulse energies. Generally speaking, shorter temporal pulse widths can be desirable as unnecessary heating of the work material can sometimes be avoided, but there can be relatively wide window of acceptable temporal pulse widths. A tunable temporal pulse width laser according to the disclosure can advantageously be configured to provide a wider range pulse energies than would otherwise be available with a fixed temporal pulse width laser. Accordingly, in one aspect of the disclosure, a pulse characteristic, such as the PP of the pulses, is monitored. When it is determined that the PP of a pulse would pass a certain threshold, such as a threshold related to SRS (e.g. with a center range of the PP SRS threshold) during amplification, the temporal pulse width is increased such that the pulse energy can continue to be increased without passing the threshold. Determining the PP the pulses may have during amplification or at another appropriate point can include a variety of techniques, including the use of an algorithm executed by the controller and which is responsive to selected input parameters, the use of a look up table stored in a memory associated with the controller, and/or the monitoring of appropriate pulse parameters using a tap coupler or other sensors incorporated with, for example, the optical architecture shown in FIG. 1. The tap coupler could monitor the output of the amplifier 24, for example.

FIG. 25 is a diagram of steps that can included in one practice of the disclosure for laser processing one or more target regions of one or more work pieces with a fiber laser that can provide pulses having different pulse energies and temporal pulse widths in a manner that addresses limitations regarding undesirable non linear effects, such as SRS, that can occur during the amplification of high energy pulses. As indicated by reference numeral 661, there is provided an optical fiber laser for providing ultrashort output pulses, the optical fiber laser including an optical fiber amplifier having a length of active optical fiber and wherein associated with the optical fiber amplifier is an optical power threshold related to the onset of stimulated Raman scattering. Typically, the fiber laser can comprise a PMLFL seed laser (e.g., such as the PMLFL seed laser 76 of FIG. 3), where the optical fiber amplifier having the Raman threshold is downstream of the PMLFL seed laser. In one useful practice of the disclosure, the PMLFL seed laser provides ultrashort or even ultrafast pulses and the processing pulses output from fiber laser fall into the ultrashort designation, although of course the method in not limited to ultrashort processing pulses.

Returning to FIG. 25, as indicated by reference numeral 665, a first pulse is amplified with the optical fiber amplifier and leaves the length of active fiber of the optical amplifier with a first pulse time duration and a first pulse energy. As indicated by reference numeral 669, downstream of the amplifier and responsive to the amplification of the first pulse, a first output pulse is directed to the first target region to process the first target region with a first amount of processing optical energy. Note that typically the PP of the output pulse as directed is not substantially greater than the PP of the pulse amplified by the optical fiber amplifier. "Not substantially greater" means that the pulse is not substantially compressed relative to its amplification by the amplifier, as in a typical chirped pulse amplification system. However, it is within the scope of the disclosure to compress pulses after amplification and before directing them to process a target region.

As indicated by reference numeral 673, it is learned that it is desirable to process the first target region or a different target region with another output pulse carrying a second amount of processing optical energy that is different than the first amount of processing optical energy. Referring now to reference numeral 677, another pulse is amplified with the optical fiber amplifier such that the another pulse leaves the length of active optical fiber of the optical fiber amplifier having a selected pulse energy that is different than the first pulse energy and a selected pulse duration that is different than the first pulse duration. However, as indicated by reference numeral 681 the selected pulse duration and selected pulse energy are such that the PP of the another pulse does not exceed the Raman power threshold, but a hypothetical pulse having the higher of the selected and first pulse energies and the shorter of the selected and first pulse durations of the pulses would have a PP exceeding the Raman threshold. Referring now to reference numeral 685, another output pulse is directed to process the first target region or to process a different target region. Typically the PP of the another pulse as directed is not substantially greater that the PP of the pulse when amplified by the amplifier. The another output pulse has a pulse energy for processing that is different (typically greater) than the first amount of processing pulse energy of the first output pulse.

Several embodiments of the invention have been described and illustrated herein. Those of ordinary skill in the art will readily envision a variety of other means and structures for performing the functions and/or obtaining the results or advantages described herein and, each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present disclosure is used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims, and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red). "Responsive to" includes being responsive to in whole or in part; for example, spectral dispersing a pulse to change its time duration can be responsive to the original spectral bandwidth of the pulse as well to as any downstream modification of the spectral bandwidth on which the spectral dispersion acts. Such spectral modification can occur as a result of, for example, self phase modulation.

The invention claimed is:

1. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse;

wherein changing the amount of spectral bandwidth or changing the amount of spectral dispersion comprises changing the amount of spectral bandwidth;

wherein changing the amount of spectral bandwidth comprises changing optical power; and wherein changing the optical power comprises amplifying.

2. The method of claim 1 wherein the optical output pulse and the another optical output pulse have time durations that are longer, respectively, than the optical pulse and the another optical pulse.

3. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse;

wherein changing the amount of spectral bandwidth or changing the amount of spectral dispersion comprises changing the amount of spectral bandwidth;

wherein changing the amount of spectral bandwidth comprises changing optical power; and wherein changing the optical power comprises attenuating.

4. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse;

wherein changing the amount of spectral bandwidth or changing the amount of spectral dispersion comprises changing the amount of spectral bandwidth;

wherein changing the amount of spectral bandwidth comprises changing optical power;

wherein the method further comprises providing a pulsed laser source; and wherein changing the optical power comprises changing the output power of the pulsed laser source.

5. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse;

wherein changing the amount of spectral bandwidth or changing the amount of spectral dispersion comprises changing the amount of spectral bandwidth;

wherein changing the amount of spectral bandwidth comprises changing an amount of self phase modulation; and wherein changing an amount of self phase modulation comprises providing an amplifier and changing the gain of the amplifier.

6. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse; and providing a laser source comprising a passively mode locked fiber laser comprising a laser cavity including a SESAM mode locking element and a length of rare earth doped optical fiber having normal dispersion at the output wavelength of the fiber laser cavity, the passively mode locked fiber laser providing pulses having a time duration of no less than 1 ps and no greater than 100 ps and a spectral bandwidth of no greater than 2 nm.

7. The method of claim 5 comprising providing a laser source comprising a passively mode locked fiber laser comprising a laser cavity including a SESAM mode locking element and a length of rare earth doped optical fiber, and wherein providing an amplifier and changing the gain of the amplifier comprises providing a non linear fiber amplifier downstream of the laser source and changing the gain thereof to change an amount of self-phase modulation provided by the nonlinear amplifier.

8. The method of claim 1 wherein changing the amount of spectral bandwidth comprises broadening the spectral bandwidth.

9. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse; and wherein changing the amount of spectral bandwidth or changing the amount of spectral dispersion comprises changing the amount of spectral dispersion.

10. The method of claim 9 wherein changing the amount of spectral dispersion comprises:

providing first and second spectrally dispersive optical elements that provide different amounts of spectral dispersion; and changing from spectrally dispersing optical pulses with the first spectrally dispersive element to spectrally dispersing optical pulses with the second spectrally dispersive optical element.

11. The method of claim 9 wherein changing the amount of spectral bandwidth or changing the amount of spectral dispersion comprises changing both of the amount of spectral bandwidth and the amount of spectral dispersion.

12. The method of claim 11 comprising providing at least one criteria related to a pulse characteristic and determining to change both the amount of spectral dispersion and the spectral bandwidth responsive to a determination regarding the at least one criteria.

13. The method of claim 12 wherein the pulse characteristic comprises the desired temporal pulse width of the second pulse.

14. The method of claim 12 wherein the pulse characteristic comprises pulse distortion.

15. The method of claim 9 wherein changing the amount of spectral bandwidth or changing the amount of spectral dispersion comprises changing both the amount of spectral bandwidth and the amount of spectral dispersion so as to provide substantially continuous tuning of the temporal pulse width of optical output pulses of the laser system over a selected range of temporal pulse widths and so as to limit the amount of distortion of optical output pulses having temporal pulse widths within the selected range.

16. The method of claim 1 wherein optical output pulses provided by the laser system have a temporal time duration of no less than 1 ps and no greater than 1 ns.

17. A method of tuning the time duration of output pulses output from a laser system, wherein the method comprises spectrally dispersing optical pulses and further comprises:

providing an optical pulse having a time duration and a spectral bandwidth;

spectrally dispersing the optical pulse so as to provide a selected change in the time duration of the pulse responsive to the spectral bandwidth of the pulse;

outputting an optical output pulse from the laser system having a first time duration that is responsive to the selected change in time duration;

providing another optical pulse;

changing the amount of spectral bandwidth of the another optical pulse to be different than that of the optical pulse or changing the amount of spectral dispersion so that spectrally dispersing the another optical pulse provides a change in time duration that is different than the selected change;

outputting another optical output pulse having a second time duration that is responsive to the different change in time duration, the second time duration of the another optical output pulse being different than the first time duration of the optical output pulse; and refraining from outputting compressed optical output pulses wherein the time duration of the optical output pulses would be less than 50% of their time duration prior to compression.

18. The method of claim 5 wherein optical output pulses provided by the laser system have a temporal time duration of no less than 1 ps and no greater than 1 ns.

19. The method of claim 9 wherein optical output pulses provided by the laser system have a temporal time duration of no less than 1 ps and no greater than 1 ns.

20. The method of claim 17 wherein optical output pulses provided by the laser system have a temporal time duration of no less than 1 ps and no greater than 1 ns.

* * * * *